United States Patent
Seok

(10) Patent No.: US 9,866,359 B2
(45) Date of Patent: Jan. 9, 2018

(54) DOWNLINK ACKNOWLEDGMENT IN RESPONSE TO UPLINK MULTIPLE USER TRANSMISSION

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 219 days.

(21) Appl. No.: 14/811,740

(22) Filed: Jul. 28, 2015

(65) Prior Publication Data
US 2016/0029373 A1    Jan. 28, 2016

Related U.S. Application Data

(60) Provisional application No. 62/127,765, filed on Mar. 3, 2015, provisional application No. 62/146,899, filed on Apr. 13, 2015.

(30) Foreign Application Priority Data

Jul. 28, 2014  (KR) .................. 10-2014-0095766
Jul. 31, 2014  (KR) .................. 10-2014-0097892

(51) Int. Cl.
*H04L 5/00*    (2006.01)
*H04L 1/16*    (2006.01)
*H04W 84/12*  (2009.01)

(52) U.S. Cl.
CPC .............. *H04L 5/0055* (2013.01); *H04L 1/16* (2013.01); *H04L 5/0007* (2013.01); *H04W 84/12* (2013.01)

(58) Field of Classification Search
CPC ....... H04W 84/12; H04L 1/1614; Y02B 60/50
See application file for complete search history.

(56) References Cited

U.S. PATENT DOCUMENTS 9,295,074 B2 *  3/2016  Zhu et al. ........... H04W 72/121

* cited by examiner

*Primary Examiner* — Chandrahas Patel

(57) ABSTRACT

The present invention provides a method and apparatus for transmitting a downlink ACK in response to an uplink multi-user transmission in a HE WLAN. In an aspect of the present invention, a method for transmitting an ACK in response to uplink data received from a plurality of STAs by an AP in a WLAN may be provided. The method may include transmitting a frame triggering transmission of a plurality of uplink data units from the plurality of STAs to the plurality of STAs, receiving a PPDU frame including a plurality of uplink data units from the plurality of STAs a predetermined IFS after transmitting the trigger frame, and transmitting an ACK frame including ACKs for the plurality of data units from the plurality of STAs.

15 Claims, 20 Drawing Sheets

FIG. 10

| L-STF | L-LTF | L-SIG | HE-SIG-A | HE-STF | HE-LTF | HE-LTF | HE-LTF | HE-LTF | HE-SIG-B | PSDU(AP to STA6) |
|---|---|---|---|---|---|---|---|---|---|---|
| | | | | HE-STF | HE-LTF | HE-LTF | HE-LTF | HE-LTF | HE-SIG-B | PSDU(AP to STA5) |
| | | | | HE-STF | HE-LTF | HE-LTF | HE-LTF | HE-LTF | HE-SIG-B | PSDU(AP to STA3,STA4) |
| | | | | HE-STF | HE-LTF | HE-LTF | HE-LTF | HE-LTF | HE-SIG-B | PSDU(AP to STA1,STA2) |

FIG. 11

| L-STF | L-LTF | L-SIG | HE-SIG-A | HE-STF | HE-LTF | HE-SIG-B | HE-LTF | HE-LTF | HE-LTF | HE-SIG-C | PSDU(AP to STA6) |
|---|---|---|---|---|---|---|---|---|---|---|---|
| | | | | HE-STF | HE-LTF | HE-SIG-B | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-SIG-C | PSDU(AP to STA1, STA2) |

| RTS PPDU (STA1 to AP) | CTS PPDU (AP to STA1, STA2, STA3, STA4) | DATA PPDU (STA4 to AP) | Block ACK PPDU (AP to STA4) |
|---|---|---|---|
| | | DATA PPDU (STA3 to AP) | Block ACK PPDU (AP to STA3) |
| | | DATA PPDU (STA2 to AP) | Block ACK PPDU (AP to STA2) |
| | | DATA PPDU (STA1 to AP) | Block ACK PPDU (AP to STA1) |

DOWNLINK ACKNOWLEDGMENT IN RESPONSE TO UPLINK MULTIPLE USER TRANSMISSION

This application claims the benefit of Korean Patent Application No. 10-2014-0095766, filed on Jul. 28, 2014, and Korean Patent Application No. 10-2014-0097892, filed on Jul. 31, 2014, which are hereby incorporated by reference as if fully set forth herein. This application claims the benefit of U.S. Provisional Application No. 62/127,765, filed on Mar. 3, 2015, and U.S. Provisional Application No. 62/146,899, filed on Apr. 13, 2015, which are hereby incorporated by reference as if fully set forth herein.

BACKGROUND OF THE INVENTION

Field of the Invention

The present invention relates to a Wireless Local Area Network (WLAN), and more particularly, to an uplink acknowledgment procedure in response to a downlink multi-user transmission in a High Efficiency WLAN (HEW), a transmission method, reception method, transmission apparatus, reception apparatus, and software using the uplink acknowledgment procedure, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a new method for performing an acknowledgement procedure in response to a multi-user transmission (i.e., a Multi-User Multiple Input Multiple Output (MU-MIMO) or Orthogonal Frequency Division Multiple Access (OFDMA) transmission) and a new method for determining frequency resources in which a multi-user transmission is performed, in order increase the use efficiency of radio resources.

The objects of the present invention are not limited to the foregoing descriptions, and additional objects will become apparent to those having ordinary skill in the pertinent art to the present invention based upon the following descriptions.

In an aspect of the present invention, a method for transmitting an ACKnowledgement (ACK) in response to uplink data received from a plurality of Stations (STAs) by an Access Point (AP) in a Wireless Local Area Network (WLAN) may be provided. The method may include transmitting a frame triggering transmission of a plurality of uplink data units from the plurality of STAs to the plurality of STAs, receiving a Physical layer Protocol Data Unit (PPDU) frame including a plurality of uplink data units from the plurality of STAs a predetermined Inter-Frame Space (IFS) after transmitting the trigger frame, and transmitting an ACK frame including ACKs for the plurality of data units from the plurality of STAs.

In another aspect of the present invention, a method for receiving an ACK in response to uplink data transmitted to an AP by an STA in a WLAN may be provided. The method may include receiving a frame triggering transmission of a plurality of uplink data units from the STA and one or more other STAs from the AP, transmitting a PPDU frame including an uplink data unit of the STA a predetermined IFS after receiving the trigger frame, when the other one or more STAs transmit one or more data units, and receiving an ACK frame including ACKs for the plurality of data units from the plurality of STAs.

In another aspect of the present invention, an AP apparatus for transmitting an ACK in response to uplink data received from a plurality of STAs in a WLAN may be provided. The AP apparatus may include a baseband processor, a Radio Frequency (RF) transceiver, and a memory. The baseband processor may be configured to transmit a frame triggering transmission of a plurality of uplink data units from the plurality of STAs to the plurality of STAs using the RF transceiver, to receive a PPDU frame including a plurality of uplink data units from the plurality of STAs a predetermined IFS after transmitting the trigger frame using the RF transceiver, and to transmit an ACK frame including ACKs for the plurality of data units from the plurality of STAs using the RF transceiver.

In another aspect of the present invention, an STA apparatus for receiving an ACK in response to uplink data transmitted to an AP in a WLAN may be provided. The STA apparatus may include a baseband processor, an RF transceiver, and a memory. The baseband processor may be configured to receive a frame triggering transmission of a plurality of uplink data units from the STA and one or more other STAs from the AP using the RF transceiver, to transmit a PPDU frame including an uplink data unit of the STA a predetermined IFS after receiving the trigger frame using the RF transceiver, when the other one or more STAs transmit one or more data units, and to receive an ACK frame including ACKs for the plurality of data units from the plurality of STAs using the RF transceiver.

In an aspect of the present invention, a software or computer-readable medium having instructions executable for an AP to transmit an ACK in response to uplink data received from a plurality of STAs in a WLAN may be provided. The executable instructions may operate the AP to transmit a frame triggering transmission of a plurality of uplink data units from the plurality of STAs to the plurality of STAs, receive a PPDU frame including a plurality of uplink data units from the plurality of STAs a predetermined IFS after transmitting the trigger frame, and transmit an ACK frame including ACKs for the plurality of data units from the plurality of STAs.

In another aspect of the present invention, a software or computer-readable medium having instructions executable for an STA to receive an ACK in response to uplink data transmitted to an AP in a WLAN may be provided. The executable instructions may operate the STA to receive a frame triggering transmission of a plurality of uplink data units from the STA and one or more other STAs from the AP, transmit a PPDU frame including an uplink data unit of the STA a predetermined IFS after receiving the trigger frame, when the other one or more STAs transmit one or more data units, and receive an ACK frame including ACKs for the plurality of data units from the plurality of STAs.

It is to be understood that both the foregoing summarized features are exemplary aspects of the following detailed description of the present invention without limiting the scope of the present invention.

According to the present invention, a technique for increasing the use efficiency of radio resources can be supported by providing a new method for performing an acknowledgement procedure in response to a multi-user transmission (i.e., an MU-MIMO or OFDMA transmission) and a new method for determining frequency resources in which a multi-user transmission is performed.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 12 depicts another exemplary HE PPDU frame format according to the present invention; exemplary FIG. 13 depicts an exemplary block ACKnowledgement (ACK) procedure in response to an Uplink (UL) Multi-User (MU) transmission according to the present invention;

DETAILED DESCRIPTION OF THE INVENTION

Figure 1:
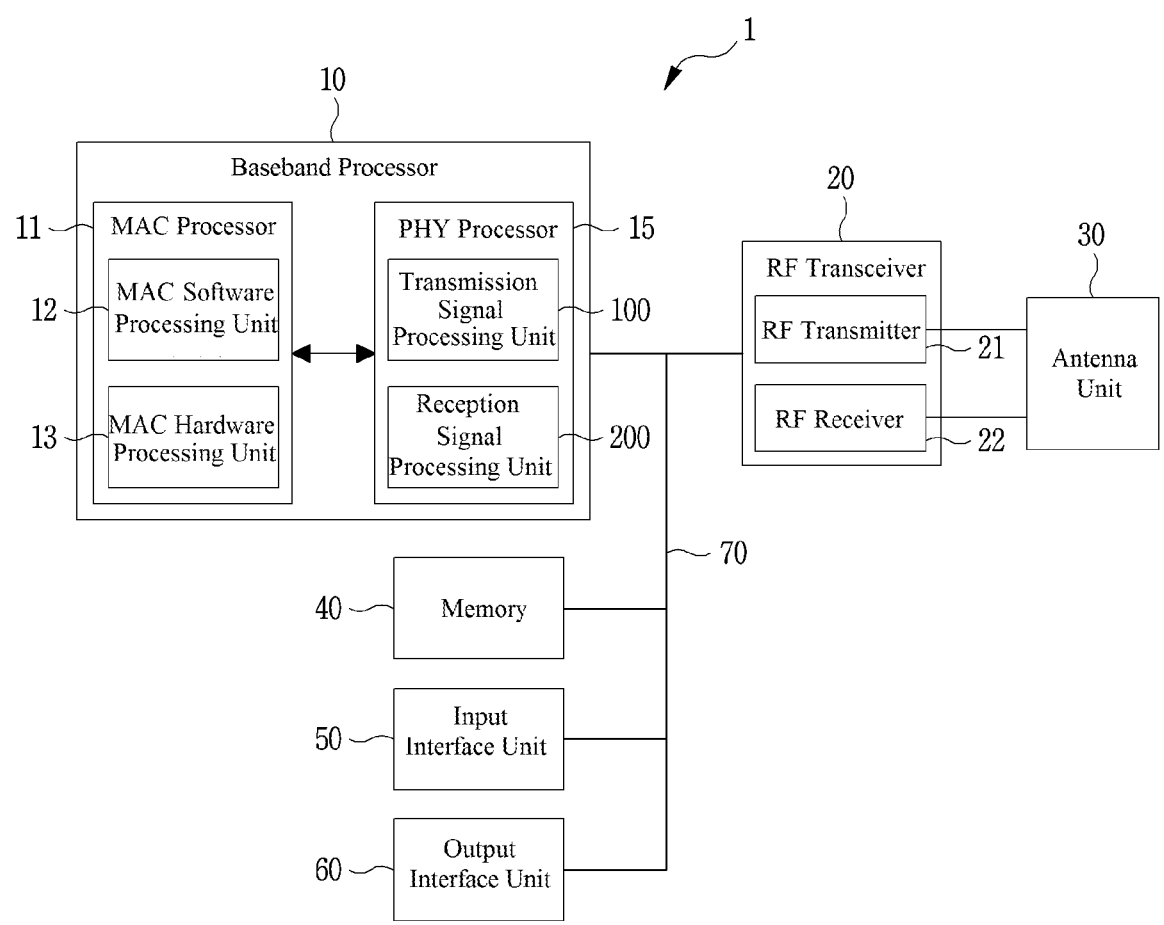
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer in conformance to Institute of Electrical and Electronics Engineers (IEEE) 802.11 series standards. At least one of the WLAN devices may be an Access Point (AP) and the other WLAN devices may be non-AP Stations (non-AP STAs). Alternatively, all of the WLAN devices may be non-AP STAs in an ad-hoc network. Generally, the term STA covers AP STA and non-AP STA. However, only a non-AP STA may be referred to as a STA, for the convenience's sake.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer as hardware (hereinafter referred to as 'MAC hardware'). However, the MAC processor 11 is not limited to the foregoing implementation examples.

The PHY processor 15 includes a transmission signal processing unit 100 and a reception signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
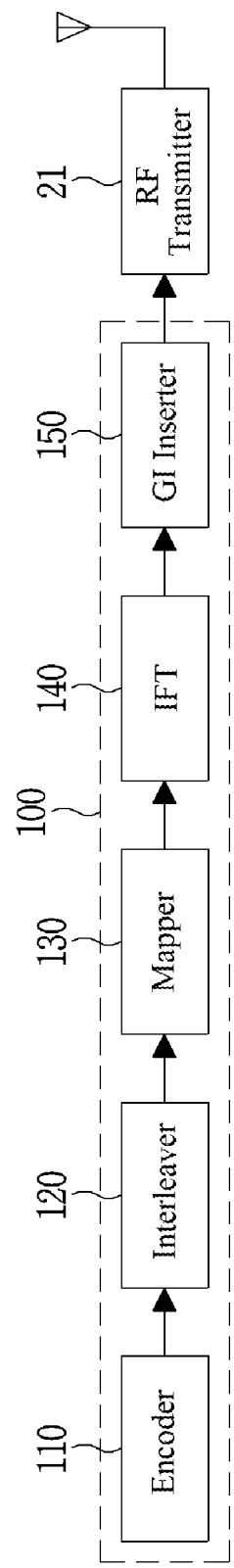
FIG. 2 is a schematic block diagram of an exemplary transmission signal processing unit in a WLAN.

FIG. 2 is a schematic block diagram of an exemplary transmission signal processor in a WLAN.

Referring to FIG. 2, the transmission signal processing unit 100 includes an encoder 110, an interleave 120, a mapper 130, an Inverse Fourier Transform (IFT) processor 140, and a Guard Interval (GI) inserter 150.

The encoder 110 encodes input data. For example, the encoder 100 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmission signal processing unit 100 may further include a scrambler for scrambling input data before encoding to reduce the probability of long sequences of 0s or 1s. If a BCC encoding scheme is used in the encoder 110, the transmission signal processing unit 100 may further include an encoder parser for demultiplexing the scrambled bits among a plurality of BCC encoders. If an LDPC encoding scheme is used in the encoder 110, the transmission signal processing unit 100 may not use the encoder parser.

The interleaver 120 interleaves the bits of each stream output from the encoder 110 to change orders of bits. Interleaving may be applied only when a BCC encoding scheme is used in the encoder 110. The mapper 130 maps a sequence of bits output from the interleaver 120 to constellation points. If an LDPC encoding scheme is used in the encoder 110, the mapper 130 may further perform LDPC tone mapping besides the constellation point mapping.

In MIMO or MU-MIMO, the transmission signal processing unit 100 may use as many interleavers 120 as and as many mappers 130 as the number $N_{SS}$ of spatial streams. In this case, the transmission signal processing unit 100 may further include a stream parser for dividing the outputs of the BCC encoders or the output of the LDPC encoder into a plurality of blocks to be provided to the different interleavers 120 or mappers 130. The transmission signal processing unit 100 may further include a Space-Time Block Code (STBC) encoder for spreading the constellation points from $N_{SS}$ spatial streams into $N_{STS}$ space-time streams and a spatial mapper for mapping the space-time streams to transmit chains. The spatial mapper may use direct mapping, spatial expansion, or beamforming.

The IFT processor 140 converts a block of constellation points output from the mapper 130 or the spatial mapper to a time-domain block (i.e., a symbol) by Inverse Discrete Fourier Transform (IDFT) or Inverse Fast Fourier Transform (IFFT). If the STBC encoder and the spatial mapper are used, the IFT processor 140 may be provided for each transmit chain.

In MIMO or MU-MIMO, the transmission signal processing unit 100 may insert Cyclic Shift Diversities (CSDs) in order to prevent unintended beamforming A CSD insertion may applied before or after IFT. A CSD may be specified for each transmit chain or for each space-time stream. Alternatively, the CSD may be applied as a part of the spatial mapper.

In MU-MIMO, some blocks before the spatial mapper may be provided for each user.

The GI inserter 150 prepends a GI to a symbol. The transmission signal processing unit 100 may optionally perform windowing to smooth edges of each symbol after inserting the GI. The RF transmitter 21 converts the symbols into an RF signal and transmits the RF signal via the antenna unit 30. In MIMO or MU-MIMO, the GI inserter 150 and the RF transmitter 21 may be provided for each transmit chain.

Figure 3:
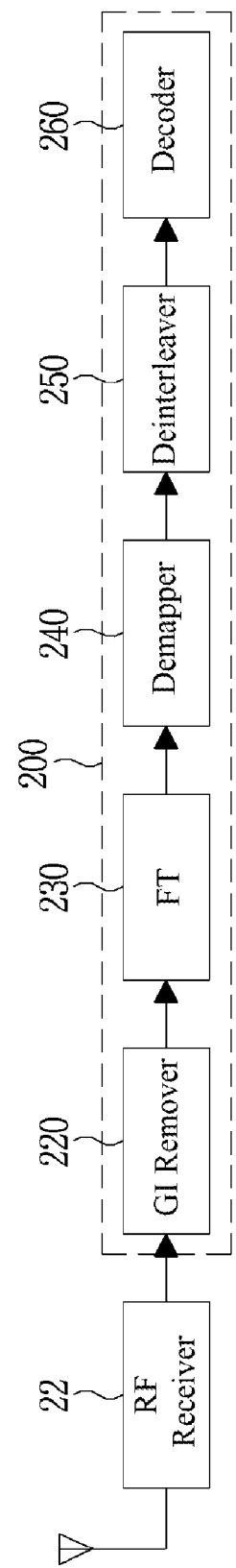
FIG. 3 is a schematic block diagram of an exemplary reception signal processing unit in a WLAN.

FIG. 3 is a schematic block diagram of an exemplary a reception signal processor in a WLAN.

Referring to FIG. 3, the reception signal processing unit 200 includes a GI remover 220, a Fourier Transform (FT) processor 230, a demapper 240, a deinterleaver 250, and a decoder 260.

The RF receiver 22 receives an RF signal via the antenna unit 30 and converts the RF signal into symbols. The GI remover 220 removes a GI from the symbols. In MIMO or MU-MIMO, the RF receiver 22 and the GI remover 220 may be provided for each receive chain.

The FT 230 converts the symbol (i.e., the time-domain block) into a block of constellation points by Discrete Fourier Transform (DFT) or Fast Fourier Transform (FFT). The FT processor 230 may be provided for each receive chain.

In MIMO or MU-MIMO, the reception signal processing unit 200 may include a spatial demapper for converting Fourier Transformed receiver chains to constellation points of space-time streams, and an STBC decoder for despreading the constellation points from the space-time streams into the spatial streams.

The demapper 240 demaps constellation points output from the FT processor 230 or the STBC decoder to bit streams. If an LDPC encoding scheme has been applied to the received signal, the demapper 240 may further perform LDPC tone demapping before the constellation demapping. The deinterleaver 250 deinterleaves the bits of each of the streams output from the demapper 240. Deinterleaving may be applied only when a BCC encoding scheme has been applied to the received signal.

In MIMO or MU-MIMO, the reception signal processing unit 200 may use as many demappers 240 and as many deinterleavers 250 as the number of spatial streams. In this case, the reception signal processing unit 200 may further include a stream deparser for combining streams output from the deinterleavers 250.

The decoder 260 decodes streams output from the deinterleaver 250 or the stream deparser. For example, the decoder 100 may be an FEC decoder. The FEC decoder may include a BCC decoder or an LDPC decoder. The reception signal processing unit 200 may further include a descrambler for descrambling the decoded data. If a BCC decoding scheme is used in the decoder 260, the reception signal processing unit 200 may further include an encoder deparser for multiplexing data decoded by a plurality of BCC decoders. If an LDPC decoding scheme is used in the decoder 260, the reception signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
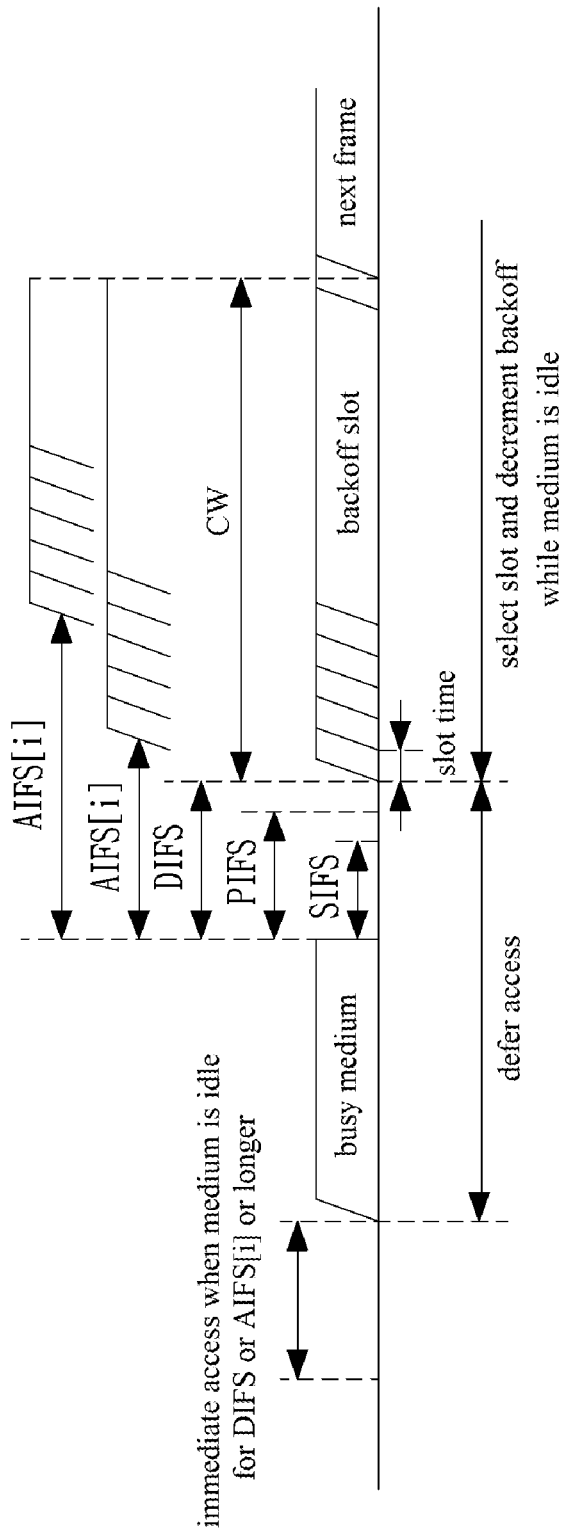
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data to be forwarded to a higher layer. After a Distributed Coordination Function IFS (DIFS) from a time when a medium gets idle, a WLAN device performs a backoff and then transmits a data frame. A management frame is used for exchanging management information which is not forwarded to the higher layer. After an IFS such as the DIFS or a Point Coordination Function IFS (PIFS), the WLAN device transmits the management frame. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. If the control frame is not a response frame to another frame, the WLAN device performs a backoff after the DIFS and then transmits the control frame; or if the control frame is a response frame to another frame, the WLAN device transmits the control frame after a Short IFS (SIFS) without a backoff. The type and subtype of a frame may be identified by a type field and a subtype field in a Frame Control (FC) field.

On the other hand, a Quality of Service (QoS) STA may perform a backoff after an Arbitration IFS (AIFS) for Access Category (AC), i.e., AIFS[i] (i is determined based on AC) and then transmit a frame. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff countdown) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
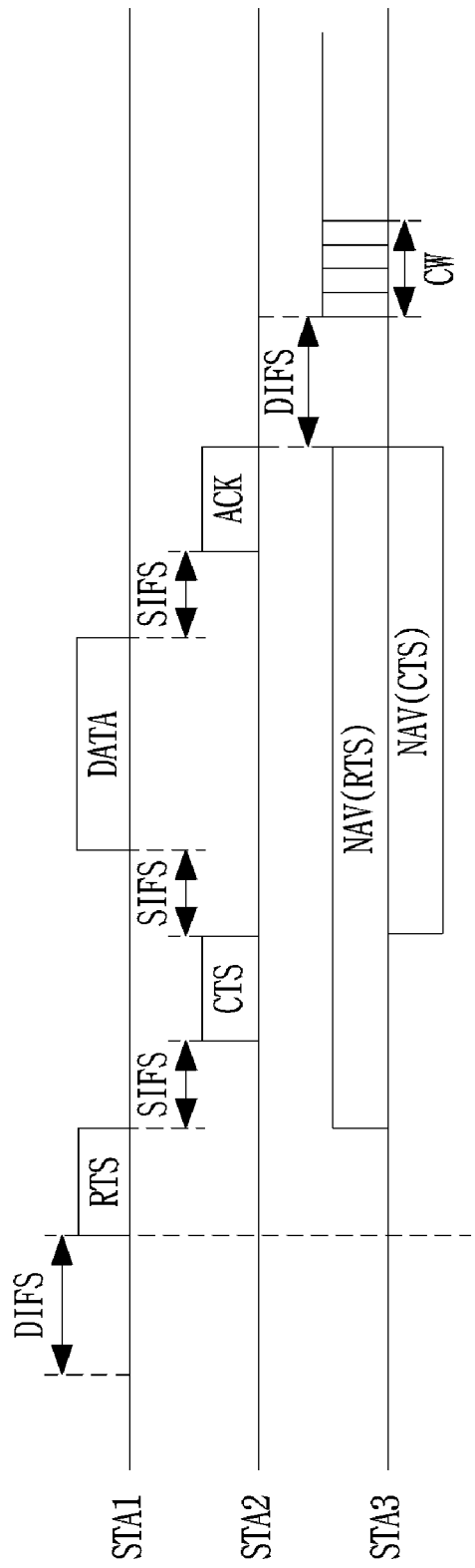
FIG. 5 is a conceptual diagram illustrating a procedure for transmitting a frame in Carrier Sense Multiple Access with Collision Avoidance (CSMA/CA) to avoid collision between frames on a channel.

FIG. 5 is a conceptual diagram illustrating a CSMA/CA-based frame transmission procedure to avoid collision between frames on a channel.

Referring FIG. 5, a first STA (STA1) is a transmitting WLAN device having data to be transmitted, a second STA (STA2) is a receiving WLAN device to receive the data from STA1, and a third STA (STA3) is a WLAN device located in an area where STA3 may receive a frame from STA1 and/or STA2.

STA1 may determine whether a channel is busy by carrier sensing. STA1 may determine channel occupancy based on an energy level of the channel or a correlation between signals on the channel, or using a Network Allocation Vector (NAV) timer.

If STA1 determines that the channel is not used by other devices during a DIFS (that is, the channel is idle), STA1 may transmit an RTS frame to STA2 after performing a backoff. Upon receipt of the RTS frame, STA2 may transmit a CTS frame as a response to the CTS frame after a SIFS.

Upon receipt of the RTS frame, STA3 may set a NAV timer for a transmission duration of following frames (e.g., a SIFS time+a CTS frame duration+a SIFS time+a data frame duration+a SIFS time+an ACK frame duration), based on duration information included in the RTS frame. Upon receipt of the CTS frame, STA3 may set the NAV timer for a transmission duration of following frames (e.g., a SIFS time+a data frame duration+a SIFS time+an ACK frame duration), based on duration information included in the CTS frame. Upon receipt of a new frame before the NAV timer expires, STA3 may update the NAV timer based on duration information included in the new frame. STA3 does not attempt to access the channel until the NAV timer expires.

Upon receipt of the CTS frame from STA2, STA1 may transmit a data frame to STA2 a SIFS after the CTS frame has been completely received. Upon successful receipt of the data frame from STA1, STA2 may transmit an ACK frame as a response to the data frame after a SIFS.

Upon expiration of the NAV timer, STA3 may determine whether the channel is busy by carrier sensing. If STA3 determines that the channel is not in use by the other devices during a DIFS after expiration of the NAV timer, STA3 may attempt channel access after a convention window according a random backoff-based CW.

Figure 6:
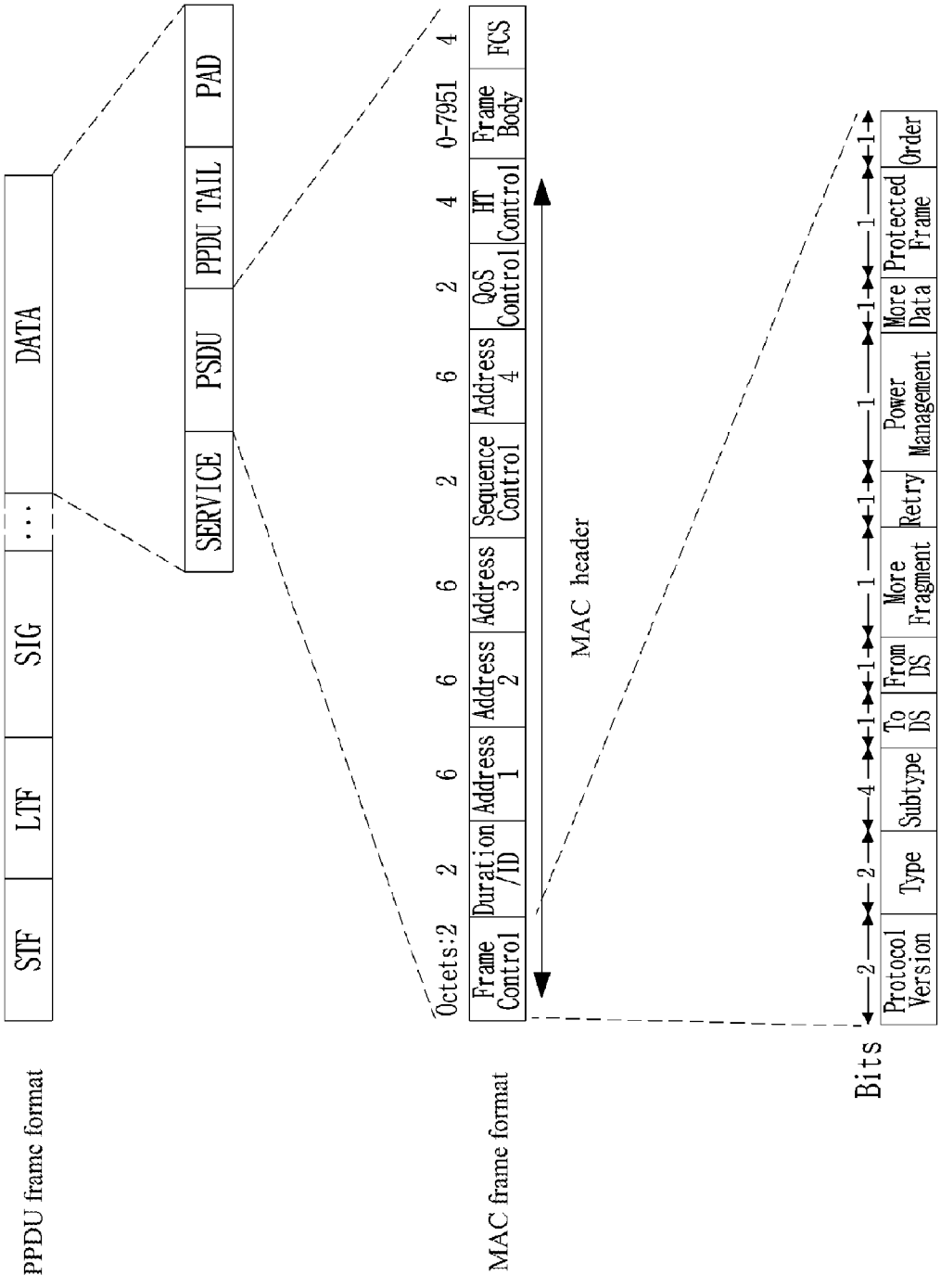
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
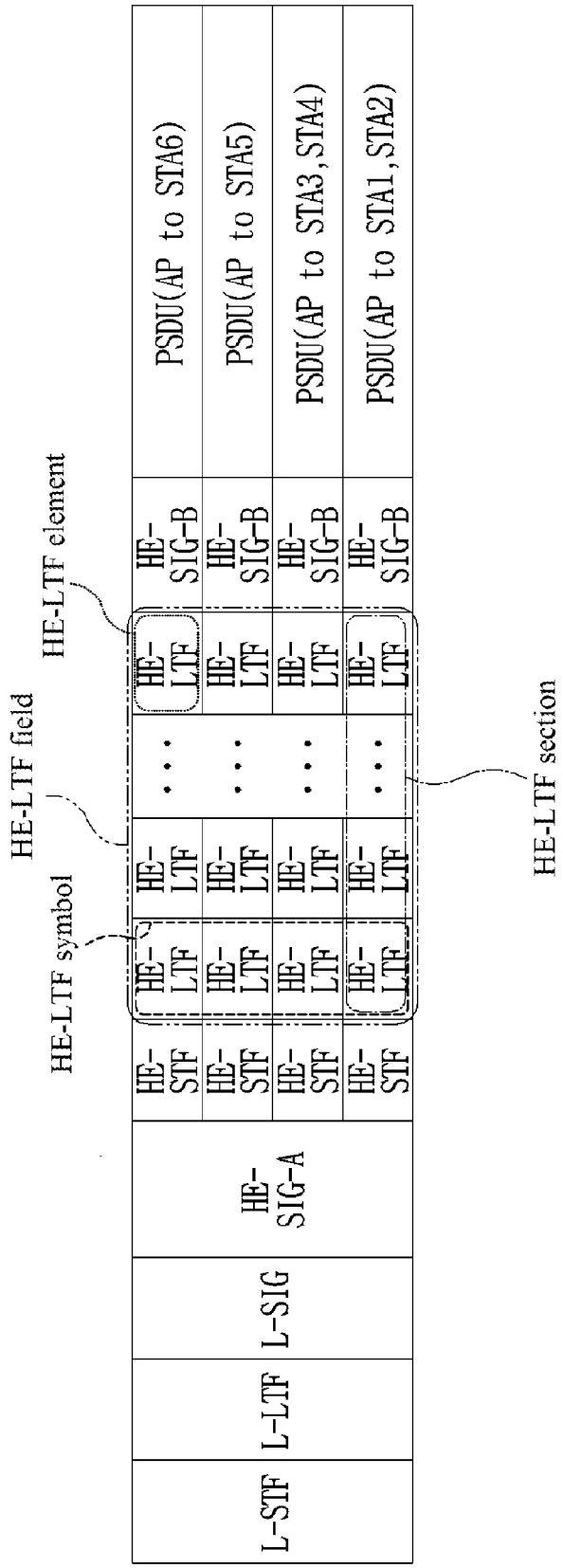
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements should be understood as logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU:<br>Set to 1 if space time block coding is used and set to 0 otherwise.<br>For a VHT MU PPDU:<br>Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits B(10 + 3p) to B(12 + 3p). The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows:<br>Set to 0 for 0 space-time streams<br>Set to 1 for 1 space-time stream<br>Set to 2 for 2 space-time streams<br>Set to 3 for 3 space-time streams<br>Set to 4 for 4 space-time streams<br>Values 5-7 are reserved<br>For a VHT SU PPDU:<br>B10-B12<br>Set to 0 for 1 space-time stream<br>Set to 1 for 2 space-time streams<br>Set to 2 for 3 space-time streams<br>Set to 3 for 4 space-time streams<br>Set to 4 for 5 space-time streams<br>Set to 5 for 6 space-time streams<br>Set to 6 for 7 space-time streams<br>Set to 7 for 8 space-time streams<br>B13-B21<br>Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise.<br>The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM} \bmod 10 = 9$; otherwise, set to 0. $N_{SYM}$ is defined in 22.4.3. |
| | B2 | SU/MU[0] Coding | 1 | For a VHT SU PPDU, B2 is set to 0 for BCC, 1 for LDPC<br>For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU:<br>VHT-MCS index<br>For a VHT MU PPDU:<br>If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1.<br>If the MU[2] NSTS field is nonzero, then B5 indicates coding for user u with USER_POSITION[u] = 2: set to 0 for BCC, 1 for LDPC. If the MU[2] NSTS field is 0, then B5 is reserved and set to 1.<br>If the MU[3] NSTS field is nonzero, then B6 indicates coding for user u with USER_POSITION[u] = 3: set to 0 for BCC, 1 for LDPC. If the MU[3] NSTS field is 0, then |

TABLE 1-continued

| Two parts of VHT-SIG-A | Bit | Field | Number of bits | Description |
|---|---|---|---|---|
| | | | | B6 is reserved and set to 1. |
| | | | | B7 is reserved and set to 1 |
| | B8 | Beamformed | 1 | For a VHT SU PPDU: |
| | | | | Set to 1 if a Beamforming steering matrix is applied to the waveform in an SU transmission as described in 20.3.11.11.2, set to 0 otherwise. |
| | | | | For a VHT MU PPDU: |
| | | | | Reserved and set to 1 |
| | | | | NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
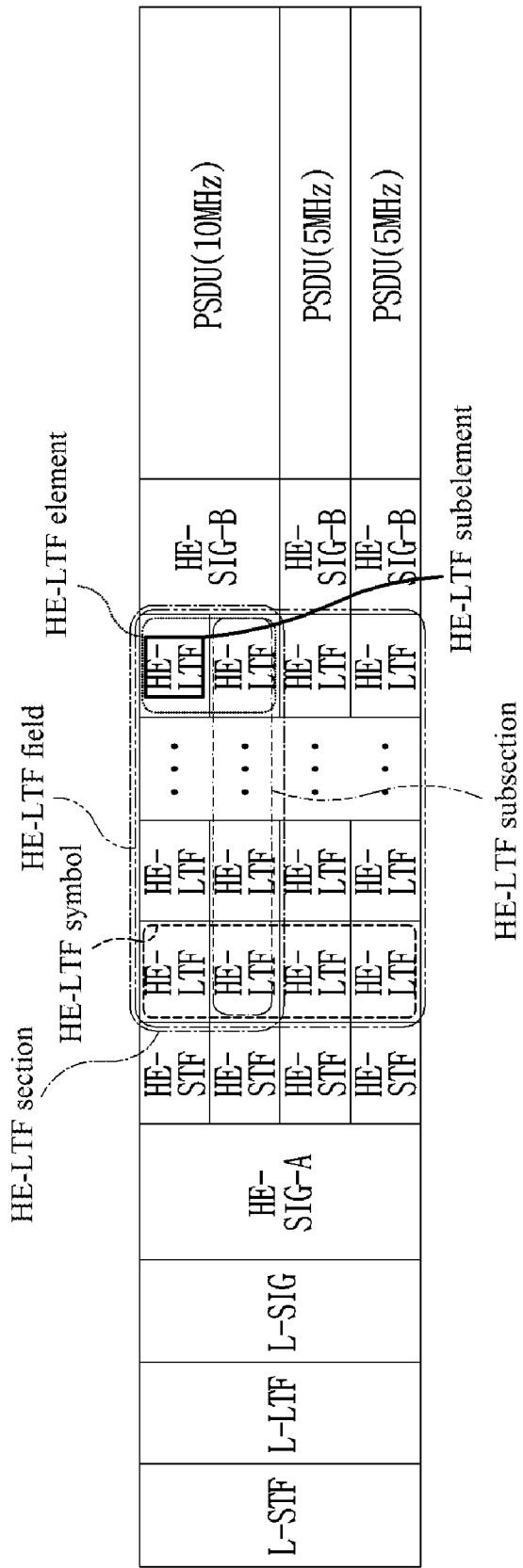
FIG. 8 depicts subchannel allocation in a HE PPDU frame format according to the present invention.

FIG. 8 depicts subchannel allocation in the HE PPDU frame format according to the present invention.

In the example of FIG. 8, it is assumed that information indicating subchannels to which STAs are allocated in HE PPDU indicates that a subchannel of 0 MHz is allocated to STA1 (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. It is to be understood that a HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of a intermediate subchannel of one channel to a STA.

Figure 9:
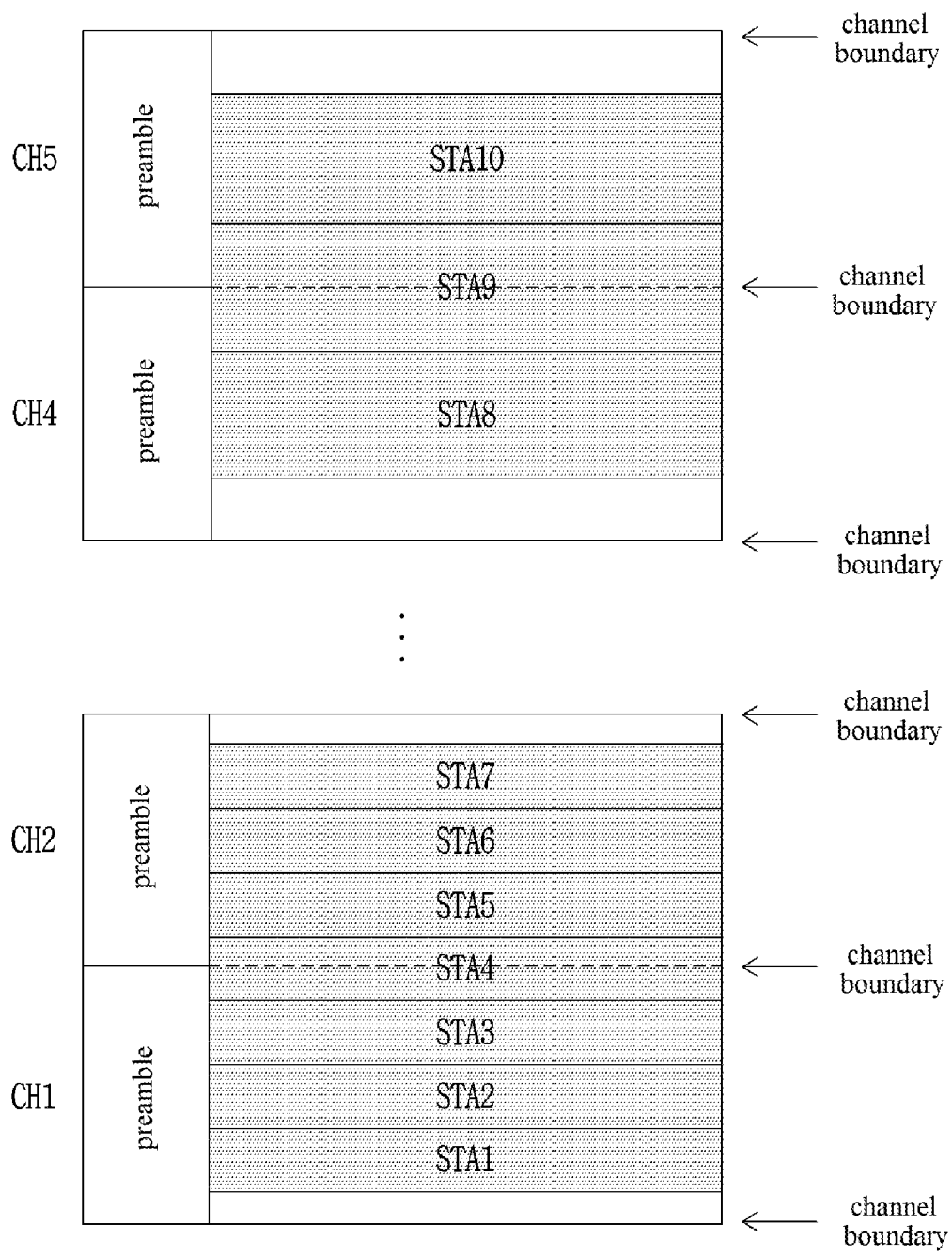
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 3]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission should not be understood as applicable only to DL without applicable UL. Rather, the examples should be understood as also applicable to UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Bandwidth (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

Figure 12:
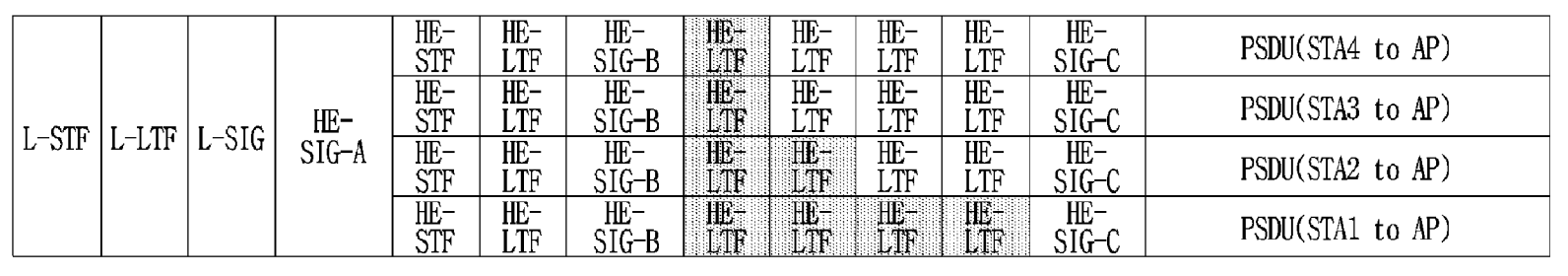

FIG. 12 depicts another exemplary HE PPDU frame format according to the present invention. The HE PPDU frame format illustrated in FIG. 12 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 12 may not exist. In this case, a description of each field given below may be understood that it is applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format to an AP on subchannels allocated to the STAs (i.e., referred to as UL MU-MIMO or OFDMA transmission, or "UL MU transmission"), and a plurality of STAs may simultaneously receive a PSDU in a HE PPDU frame format from an AP on subchannels allocated to the STAs (i.e., referred to as DL MU-MIMO or OFDMA transmission, or "DL MU transmission").

Now, a description will be given of an exemplary ACK procedure of a receiver (i.e., an AP) in response to a UL MU-MIMO or OFDMA transmission and an exemplary ACK procedure of a receiver (i.e., each of a plurality of STAs) in response to a DL MU-MIMO or OFDMA transmission according to the present invention.

According to the present invention, ACK frames transmitted in response to an MU transmission for a plurality of STAs may have the same property for each of the STAs. Specifically, ACK frames transmitted in response to an MU transmission for a plurality of STAs may have the same length, transmission time, or type for each of the STAs. An AP may transmit DL ACK frames to a plurality of STAs in response to a UL MU transmission and the DL ACK frames for the STAs may have the same property. The plurality of STAs may transmit UL ACK frames to the AP in response to a DL MU transmission and the UL ACK frames from the STAs may have the same property.

Such an MU transmission for a plurality of STAs may be elicited by a trigger frame transmitted from an MU transmission-receiver. For example, the trigger frame may be a CTS frame, a PS-Poll frame, or an ACK frame.

FIG. 13 depicts an exemplary block ACK procedure performed in response to a UL MU transmission according to the present invention.

FIG. 13 illustrates an example in which ACK frames for a UL MU transmission elicited by a trigger frame (i.e., a CTS frame) transmitted from an AP have the same property for each of a plurality of STAs. In FIG. 13, a plurality of STAs respectively transmit data frames (e.g., PPDU frames each including a PSDU, on a plurality of subchannels) on subchannels allocated to the STAs and receive ACKs in block ACK frames from an AP in response to the transmitted data frames.

In the example of FIG. 13, upon expiration of a backoff timer, an STA (e.g., STA1) may transmit an RTS PPDU to the AP according to an Enhanced Distributed Channel Access (EDCA) protocol.

Upon receipt of the RTS PPDU, the AP may determine STAs (e.g., STA2, STA3, and STA4) to perform a UL MU-MIMO or OFDMA transmission simultaneously with STA1 and transmit a CTS PPDU to the plurality of STAs. The CTS PPDU may include a list of STAs (e.g., STA1, STA2, STA3, and STA4) allowed to be allocated to subchannels and perform simultaneous PSDU transmissions on the subchannels. That is, the CTS PPDU may correspond to the afore-described trigger frame (or polling frame) for a UL MU-MIMO or OFDMA transmission.

Upon receipt of an indication allowing a UL MU-MIMO or OFDMA transmission in the CTS PPDU, the STAs transmit PSDUs on their allocated subchannels. In the example of FIG. 13, STA1, STA2, STA3, and STA4 transmit DATA PPDUs respectively on four subchannels. While not shown for clarity of description, the plurality of DATA PPDUs may be transmitted in a HE PPDU frame format in FIG. 13 (e.g., one or more of a L-STF, a L-LTF, a L-SIG, and a HE-SIG-A are transmitted on one channel, one or more of a HE-STF, a HE-LTF, a HE-SIG-B, and a HE-SIG-C are transmitted respectively on each subchannel, and a PSDU is transmitted on each subchannel). That is, a DATA PPDU for an STA allocated to one subchannel is a data frame including one or more of a L-STF, a L-LTF, a L-SIG, and a HE-SIG-A on one channel, one or more of a HE-STF, a HE-LTF, a HE-SIG-B, and a HE-SIG-C on one subchannel, and a PSDU on one subchannel. This may be referred to as a data frame on a subchannel from the perspective of a PSDU (i.e., an MPDU or A-MPDU). Further, a set of the plurality of DATA PSDUs illustrated in FIG. 13 corresponds to a HE PPDU frame including a legacy preamble, a HE preamble, and PSDUs (i.e., MPDUs or A-MPDUs) on a plurality of subchannels and this may be referred to as a data frame on one channel including a plurality of subchannels, from the perspective of PSDUs (i.e., MPDUs or an Aggregate MPDU (A-MPDU)).

Upon receipt of PSDUs on the respective subchannels from the plurality of STAs, the AP may transmit ACKs in response to the received PSDUs, in the form of blocks ACKs on the subchannels in which the PSDUs haven been received. A block ACK procedure is a scheme in which one block ACK frame is used for a plurality of MPDUs instead of individual ACKs for all MPDUs. An MPDU transmitted from the MAC layer to the PHY layer may correspond to a PSDU at the PHY layer (although an MPDU is similar to a PSDU, a plurality of individual MPDUs aggregated into an A-MPDU may be different from the PSDU). The block ACK frame includes a block ACK bitmap and each bit of the block ACK bitmap may indicate reception success/failure (or decoding success/failure) of an individual MPDU. For details of a legacy block ACK procedure, the IEEE 802.11c technical specifications may be referred to.

A detailed configuration of ACK PPDUs on a plurality of subchannels in the example of FIG. 13, may be described in a similar manner to the afore-described detailed configuration of DATA PPDUs on a plurality of subchannels. That is, ACK PPDUs on a plurality of subchannels may collectively correspond to ACK frames constructed in a HE PPDU frame format and may be referred to as an ACK frame on one channel including a plurality of subchannels from the perspective of PSDUs (i.e., MPDUs or an A-MPDU). From the viewpoint of individual ACK PPDUs, each ACK PPDU may be an ACK frame including a legacy preamble transmitted on one channel, and a HE preamble and a PSDU transmitted on one subchannel and may be referred to as an ACK frame on a subchannel from the perspective of a PSDU (i.e., an MPDU or A-MPDU).

As described above, a plurality of block ACK frames that an AP transmits to a plurality of STAs on a plurality of subchannels at the same time may have the same property (e.g., the same length, transmission time, or type).

Figure 14:
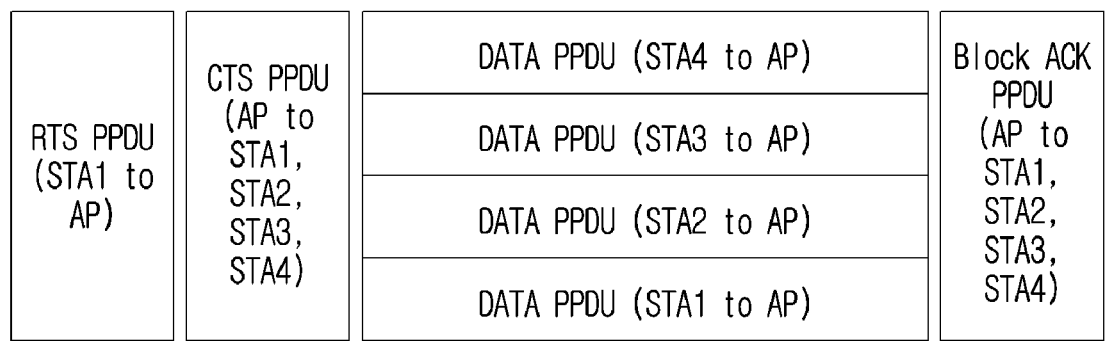
FIG. 14 depicts another exemplary block ACK procedure in response to a UL MU transmission according to the present invention.

FIG. 14 depicts another exemplary block ACK procedure performed in response to a UL MU transmission according to the present invention.

FIG. 14 illustrates an example in which ACK frames for a UL MU transmission elicited by a trigger frame (i.e. a CTS frame) from an AP have the same property for the plurality of STAs. In the example of FIG. 14, transmission of an RTS PPDU, transmission of a CTS PPDU, and MU-MIMO or OFDMA transmission of a DATA PPDU on an allocated subchannel by each STA are performed in the same manner as in FIG. 13 and thus will not be described to avoid redundancy.

As in the afore-described example of FIG. 13, a procedure for transmitting block ACK PPDUs to a plurality of STAs on a plurality of subchannels in response to a received UL MU-MIMO or OFDMA transmission increases overhead in view of configuration of a different DATA PPDU for each subchannel by the AP. Accordingly, a block ACK for a UL MU-MIMO or OFDMA transmission may be transmitted on total subchannels in the example of FIG. 14.

That is, it may be said that the AP transmits block ACK PPDUs in OFDMA to the individual STAs at the same time in FIG. 13, while the AP multicasts/broadcasts a block ACK PPDU having an aggregate of block ACK bitmaps for the respective STAs on the total subchannels (e.g., on one channel without distinction made between the subchannels, that is, in non-OFDMA). Accordingly, the overhead of the AP may be reduced, compared to generation and transmission of PPDUs on individual subchannels.

In this manner, one block ACK frame that the AP transmits on one channel to the plurality of STAs may have the same property (e.g., the same length, transmission time, or type).

According to the present invention, an MU-transmission receiver may determine a channel access operation depending on whether a reception error has occurred during an MU transmission. It may be determined based on a minimum MU transmission unit whether a reception error has occurred to an MU transmission related to a plurality of users. Specifically, if there is no reception error for at least one user of an MU transmission, it may be determined that the MU transmission is error-free. Or if there is no reception error for at least one subchannel of the MU transmission, it may be determined that the MU transmission is error-free. Inter-Frame Space (IFS) processing of channel access may be different depending on whether a reception error has occurred. The MU-transmission receiver may be an intended destination or a third-party STA. For example, in the case of a UL MU transmission, the same channel access operation may be performed according to generation or non-generation of a reception error irrespective of whether the MU transmission receiver is an AP or a third-party STA.

Further, an MU transmission may be transmitted as a frame responding to a trigger frame. For example, a plurality of users may transmit UL OFDMA MPDUs or A-MPDUs in response to a trigger frame received from an AP. Upon successful receipt of an MU transmission from at least one user (i.e., without a reception error), the MU-transmission receiver (e.g., the AP) may determine that a frame exchange procedure initiated by the trigger frame is successful and the MU transmission is free of an error.

In the case where the AP multicasts/broadcasts a block ACK PPDU across total subchannels to a plurality of transmitting STAs as in the example of FIG. 14, block bitmaps for the respective transmitting STAs (e.g., STA1, STA2, STA3, and STA4) should be included in the block ACK PPDU. In addition, control information about each of the transmitting STAs (e.g., a Frame Control field, a QoS control field, a (HE variant) HT control field) may be included in the block ACK PPDU. The (HE variant) HT control field may be used for a data receiver to indicate most optimum transmission parameters (e.g., an MCS, the number of spatial streams, etc.) for the data receiver to a data transmitter (e.g., a source).

For example, if an STA operates in Power Save Mode (PSM) and then starts a Service Period (SP) by transmitting a trigger frame to the AP, an End Of Service Period (EOSP) subfield may be set to 1 in a QoS control field of the last frame transmitted by the AP in order to indicate the ending point of one or more frames transmitted to the STA by the AP. Upon receipt of the EOSP subfield, the STA may terminate the SP. If a plurality of transmitting STAs operate in the PSM and then start an SP by transmitting trigger frames as in the example of FIG. 14, an EOSP subfield of a QoS control field of a frame transmitted by the AP may be signaled separately to each transmitting STA because the SP may end at different time points for the transmitting STAs. Further, one or more of a QoS control field, a Frame Control field, and an (HE variant) HT control field may be separately signaled to each data transmitting STA.

Meanwhile, if only one piece of control information (e.g., only one of a Frame Control field, a QoS control field, and a (HE variant) HT control field) is included in a block ACK PPDU, the control information may be applied commonly to the plurality of data transmitting STAs.

Figure 15:
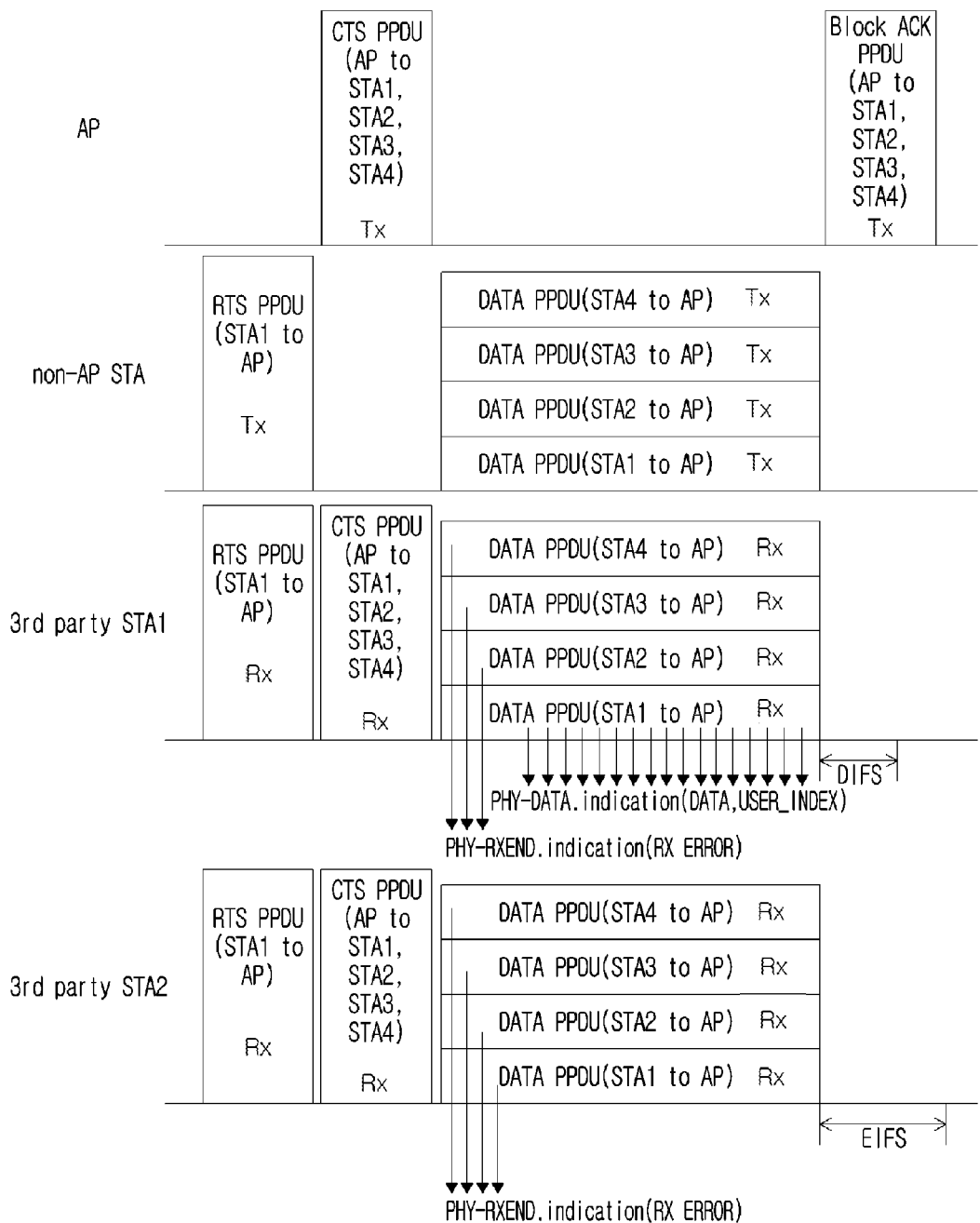
FIG. 15 depicts an operation for receiving an MU PPDU according to the present invention.

FIG. 15 depicts an operation for receiving an MU PPDU according to the present invention.

In the example of FIG. 15, a procedure in which an AP allocates subchannels to a plurality of STAs (e.g., STA1, STA2, STA3, and STA4) and the STAs simultaneously transmit PSDUs on the subchannels to the AP, and an operation of a third-party STA (i.e., an STA other than the STAs and the AP that exchange frames during a predetermined time period) are illustrated. In FIG. 15, non-AP STAs, STA1, STA2, STA3, and STA4 exchange frames with the AP, and third-party STA1 and third-party STA2 (i.e., STAs other than STA1 and STA2 that exchange frames with the AP) receive (i.e., overhear) the frames that the AP transmits or STA1, STA2, STA3, and STA4 transmit.

The third-party STAs may overhear all frames transmitted on a radio medium and perform virtual carrier sensing or physical carrier sensing. The virtual carrier sensing may include, for example, configuration of a Network Allocation Vector (NAC) based on a Duration field included in an overheard frame. The physical carrier sensing may include, for example, energy detection, preamble detection, and GI detection. These carrier sensing operations may be performed basically through primitives transmitted to the MAC layer by the PHY layer. For example, a timing at the MAC layer may be determined using primitives called PHY-TXEND.confirm, PHYTXSTART.confirm, PHY-RX-START.indication, and PHY-RXEND.indication as references.

Among them, an example of the present invention regarding the PHY-RXEND.indication primitive and the PHY-DATA.indication primitive which are related to channel access of third-party STAs will be described in detail.

The PHY-RXEND.indication primitive is indication information indicating completion of on-going PSDU reception to a local MAC entity by the PHY layer. This primitive provides the parameters illustrated in [Table 3] below.

TABLE 3

PHY-RXEND.indication(
RXERROR,
RXVECTOR
)

In [Table 3], the RXERROR parameter may provide one or more of values indicating NoError, FormatVioloation, CarrierLost, or UnsupportedRate. After a receive state machine at the PHY layer detects what seems to be a valid preamble and a Start Frame Delimiter (SFD), many error conditions may take place. Parameters returned for each of the error conditions are given as follows.

NoError. This value is used to indicate that no error has been generated in a PHY reception process.

Format Violation. This value is used to indicate the presence of an error in the format of a received PPDU.

CarrierLost. This value is used to indicate that PSDU processing may not be performed any longer because a carrier cannot be found during reception of an incoming PSDU.

UnsupportedRate. This value is used to indicate that an unsupported data rate has been detected during reception of an incoming PSDU.

Filtered. This value is used to indicate that a corresponding PPDU has been filtered out due to a condition set by PHYCONFIG_VECTOR during reception of an incoming PSDU In [Table 3], RXVECTOR indicates a list of parameters provided to the local MAC entity, when the PHY layer receives a valid PHY header or the last PSDU data bit of a received frame. RXVECTOR is a parameter included only when a dot11RadioMeasurementActivated parameter is set to true. RXVECTOR may include all of MAC parameters and MAC management parameters.

The PHY-RXEND.indication primitive may be generated to indicate to the local MAC entity that the PHY receive state machine has completed reception with or without an error. In the presence of Signal Extension, the PHY-RX-END.indication primitive may be generated at the termination point of a signal extension.

If the value of RXERROR is NoERROR, the MAC layer may use the PHY-RXEND.indication primitive as a reference for a channel access timing.

Upon receipt of the PHY-RXEND.indication primitive, the MAC layer may start IFS processing.

The IFS processing will be described. After receiving a frame for which a PHY-RXEND.indication primitive indicating an error is reported or a frame having a wrong MAC FCS value, a DCF uses an Extended IFS (EIFS) to determine whether a medium is idle before transmission. Likewise, an EDCA mechanism based on a Hybrid Coordination Function (HCF) of an STA may use an interval of EIFS-DIFS+AIFS[AC]. The EIFS or the EIFS-DIFS+AIFS[AC] interval starts after there is an indication indicating that the medium is idle irrespective of a virtual carrier sensing mechanism, after the PHY layer detects an erroneous frame. An STA does not start transmission before expiration of the later between a NAV and the EIFS or EIFS-DIFS+AIFS[AC]. The EIFS or EIFS-DIFS+AIFS[AC] is defined to provide a time sufficient for another STA to transmit an ACK in response to a frame. That is, because a frame for the other STA has been received wrongly on the part of the STA using the EIFS or EIFS-DIFS+AIFS[AC], it may be said that the STA waits for a time enough for another STA to transmit an ACK before the STA starts its transmission. Upon receipt of an error-free frame during the EIFS or EIFS-DIFS+AIFS [AC], the medium is resynchronized to a busy or idle state and thus the EIFS or EIFS-DIFS+AIFS[AC] is terminated. After receiving the corresponding frame, the STA may resume medium access (using an appropriate one between a DIFS and an AIFS and when needed, by backoff). Upon expiration or termination of the EIFS or EIFS-DIFS+AIFS [AC], the STA may control medium access by using a NAV and physical carrier sensing.

The PHY-DATA.indication primitive indicates data transfer from the PHY layer to the local MAC entity. This primitive provides the parameters listed in [Table 4] below.

TABLE 4

PHY-DATA.indication(
  DATA
  USER_INDEX
)

In [Table 4], the DATA parameter is an octet having a value ranging from X'00' to X'FF'.

In [Table 4], the USER_INDEX parameter may be typically set to u for a HE STA. The USER_INDEX parameter exists for an MU PPDU (e.g., HE UPLINK OFDMA PPDU, HE DOWNLINK OFDMA PPDU, HE UPLINK MU PPDU, or HE DOWNLINK MU PPDU), indicating the index of a user in RXVECTOR to which the DATA octet is applied. Otherwise, USER_INDEX may not be included.

The PHY-DATA.indication primitive may be generated for a receiving PHY entity to transmit an octet of received data to the local MAC entity. The time between a reception time of the last bit of the last octet provided on a radio medium and a reception time of the PHY-DATA.indication primitive at the MAC entity may correspond to a delay time for processing at the PHY layer, expressed as aRxPHYDelay.

A channel access procedure of third-party STAs in the example of FIG. 15 will be described based on the aforedescribed PHY-RXEND.indication primitive and PHY-DATA. indication primitive.

As in the example of FIG. 14, STA1 transmits an RTS PPDU to the AP, the AP transmits a CTS PPDU including a list of STA1, STA2, STA3, and STA4, each STA transmits a DATA PPDU on its allocated subchannel in MU-MIMO or OFDMA, and the AP transmits a block ACK PPDU to STA1, STA2, STA3, and STA4 across total subchannels (i.e., on one channel) in the example of FIG. 15. Thus, a redundant description is not provided herein Since third-party STA1 has not received the PLCP headers of DATA PPDUs successfully from STA2, SAT3, and STA4 (i.e., in view of a reception error), third-party STA1 may notify the MAC layer of error generation by setting the status information of RXERROR to indicate error generation in the PHY-RXEND.indication primitive (for example, by setting a value other than NoError. Meanwhile, as third-party STA1 successfully receives a DATA PPDU from STA1 (i.e., STA1 being one of the non-AP STAs in FIG. 15), third-party STA1 may set USER_INDEX to a value indicating STA1 (i.e., STA1 being one of the non-AP STAs in FIG. 15) in a PHY-DATA.indication primitive and transmit octet information of the received PSDU to the MAC layer. Subsequently, after transmission of the PPDU is completed, third-party STA1 may perform IFS processing by setting an IFS for the next channel access to the DIFS.

In a legacy WLAN (e.g., a system conforming to a standard such as IEEE 802.11b/g/n/ac/ad/af/ah), if the PHY layer reports a PHY-RXEND.indication primitive with status information of RXERROR to a value indicating error generation (e.g., a value other than NoError), the IFS is set to an EIFS, for the next channel access. It is to be noted that compared to this operation of the legacy STA, third-party STA1 attempts the next channel access based on the DIFS, instead of the EIFS in the present invention.

This is because although third-party STA1 has failed to receive the PLCP headers of DATA PPDUs from STA2, STA3, and STA4 and thus reports a PHY-RXEND.indication primitive with RXERROR set to a value indicating error generation to the MAC layer, third-party STA1 has successfully received a DATA PPDU from STA1 and may perform virtual carrier sensing by normally setting a NAV based on the received DATA PPDU.

If third-party STA1 has received the DATA PPDU from STA1 with an error, third-party STA1 may use the EIFS when attempting the next channel access (this may correspond to an operation of third-party STA2 described later in the example of FIG. 15).

That is, when a legacy STA successfully receives a frame without an error (e.g., the PHY-RXEND.indication primitive does not indicate error generation), the legacy STA uses the DIFS. On the other hand, when the legacy STA fails to receive a frame (e.g., the PHY-RXEND.indication primitive indicates error generation), the legacy STA uses the EIFS. However, even though a reception error occurs in a frame on some subchannel, as far as an STA successfully receives a frame without an error on at least one subchannel, the STA may use the DIFS instead of the EIFS in the present invention.

As third-party STA1 fails to receive the PLCP headers of DATA PPDUs from STA1, STA2, SAT3, and STA4 (i.e., due to a reception error), third-party STA1 may transmit a PHY-RXEND.indication primitive with status information of RXERROR set to a value indicating error generation (e.g., a value other than NoError) to the MAC layer. Then, after transmission of the PPDUs is completed, third-party STA2 may perform IFS processing by setting the IFS for the next channel access to the EIFS.

That is, if error generation is reported for all users (or all subchannels) by status information of RXERROR of a PHY-RXEND.indication primitive for a frame received at a third-party STA, the third-party STA may attempt the next channel access procedure using the EIFS.

According to an embodiment of the present invention, in order to support the above operation, subchannel identification information or user identification information (e.g., USER_INDEX) is added to the RXVECTOR parameter of the PHY-RXEND.indication reported to the MAC layer by the PHY layer. Thus, the MAC layer may determine from the PHY-RXEND.indication primitive reported by the PHY layer whether there are errors for all users (or all subchannels). In the absence of an error for at least one user (or at least one subchannel), the DIFS is set for the next medium access. In the presence of errors for all users (or all subchannels), the EIFS may be set for the next medium access.

While a channel access procedure of third-party STAs is shown in FIG. 15 as performed based on the PHY-RXEND-.indication primitive and the PHY-DATA.indication primitive, the same channel access scheme may also be performed for a destination STA of a HE MU PPDU frame (i.e., not an overhearing third-party STA but an intended receiving STA).

For example, it is assumed that a destination STA of HE MU PPDUs transmitted by STA1, STA2, STA3, and STA4 is an AP.

As the AP fails to receive the PLCP headers of DATA PPDUs from STA2, STA3, and STA4, the AP may provide a PHY-RXEND.indication primitive with status information of RXERROR set to a value indicating error generation (e.g., a value other than NoError) to the MAC layer. On the other hand, as the AP successfully receives a PSDU of a DATA PPDU from STA1, the AP may set USER_INDEX of a PHY-DATA.indication primitive to STA1 and provide octet information of the PSDU to the MAC layer. Then, after transmission of the PPDU is completed, the AP may set the IFS to the DIFS, for the next channel access.

Meanwhile, as the AP fails to receive the PLCP headers of the DATA PPDUs from STA2, STA3, and STA4, the AP may provide the PHY-RXEND.indication primitive with status information of RXERROR set to a value indicating error generation (e.g., a value other than NoError) to the MAC layer. Then, after transmission of the PPDUs is completed, the AP may set the IFS to the EIFS, for the next channel access.

As described above, information such as USER_INDEX (i.e., a parameter indicating whether a reception error has occurred for each subchannel or each user) may be added to the PHY-RXEND.indication primitive in an embodiment of the present invention. Therefore, if a data frame is successfully received from at least one STA (or on at least one subchannel) among data frames (e.g., HE MU PPDU frames) transmitted simultaneously by a plurality of STAs, it may be determined that data frames have been successfully received from all users (or on all subchannels) and an IFS value may be set (e.g., to the DIFS), for the next channel access. If none of the data frames have been received successfully from all STAs (or on all subchannels), an IFS value is set (e.g., to the EIFS) for the next channel access, as in the case of a frame reception error.

Figure 16:
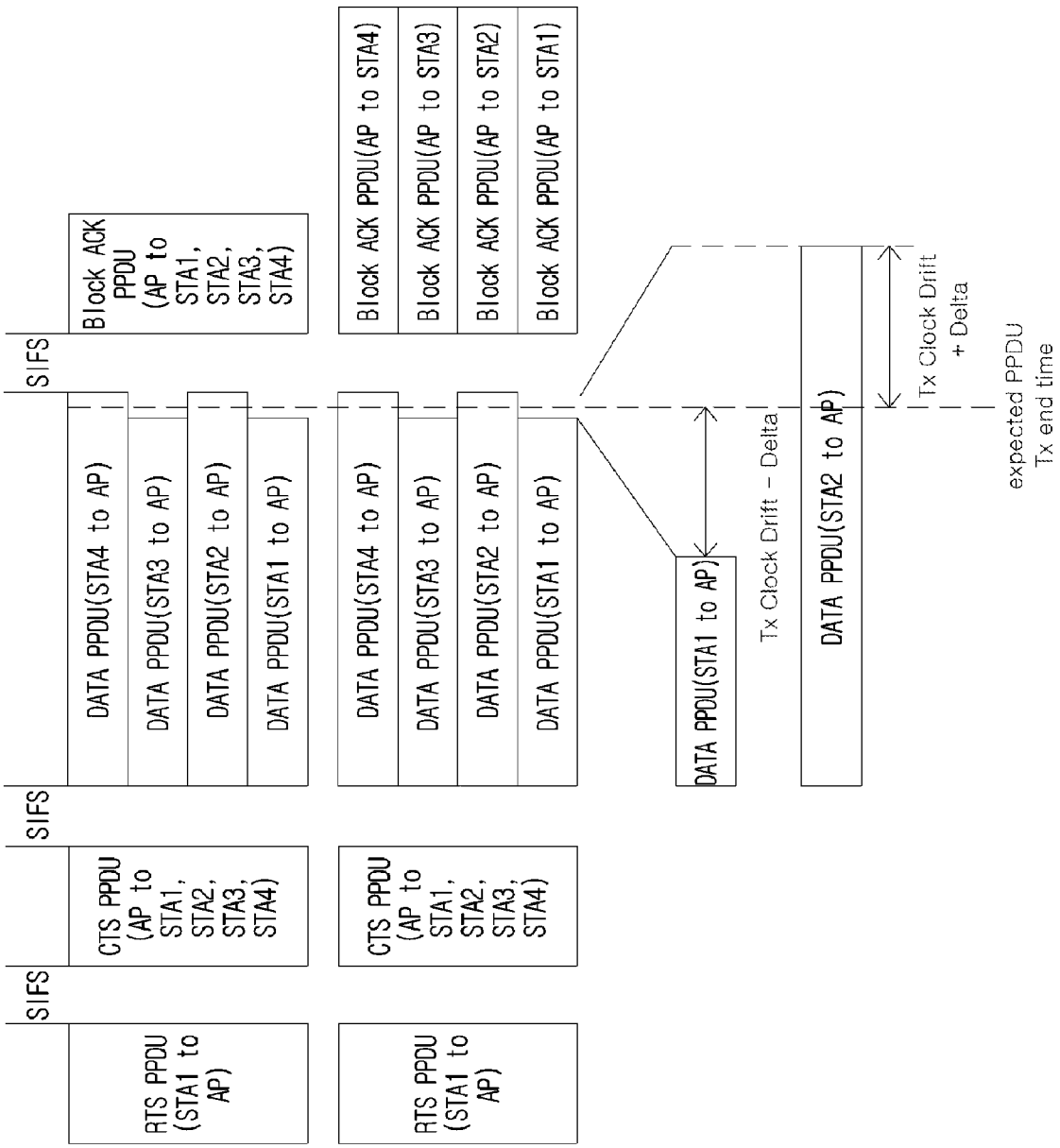
FIGS. 16 and 17 depict a method for setting an ACK timeout according to the present invention.
Figure 17:
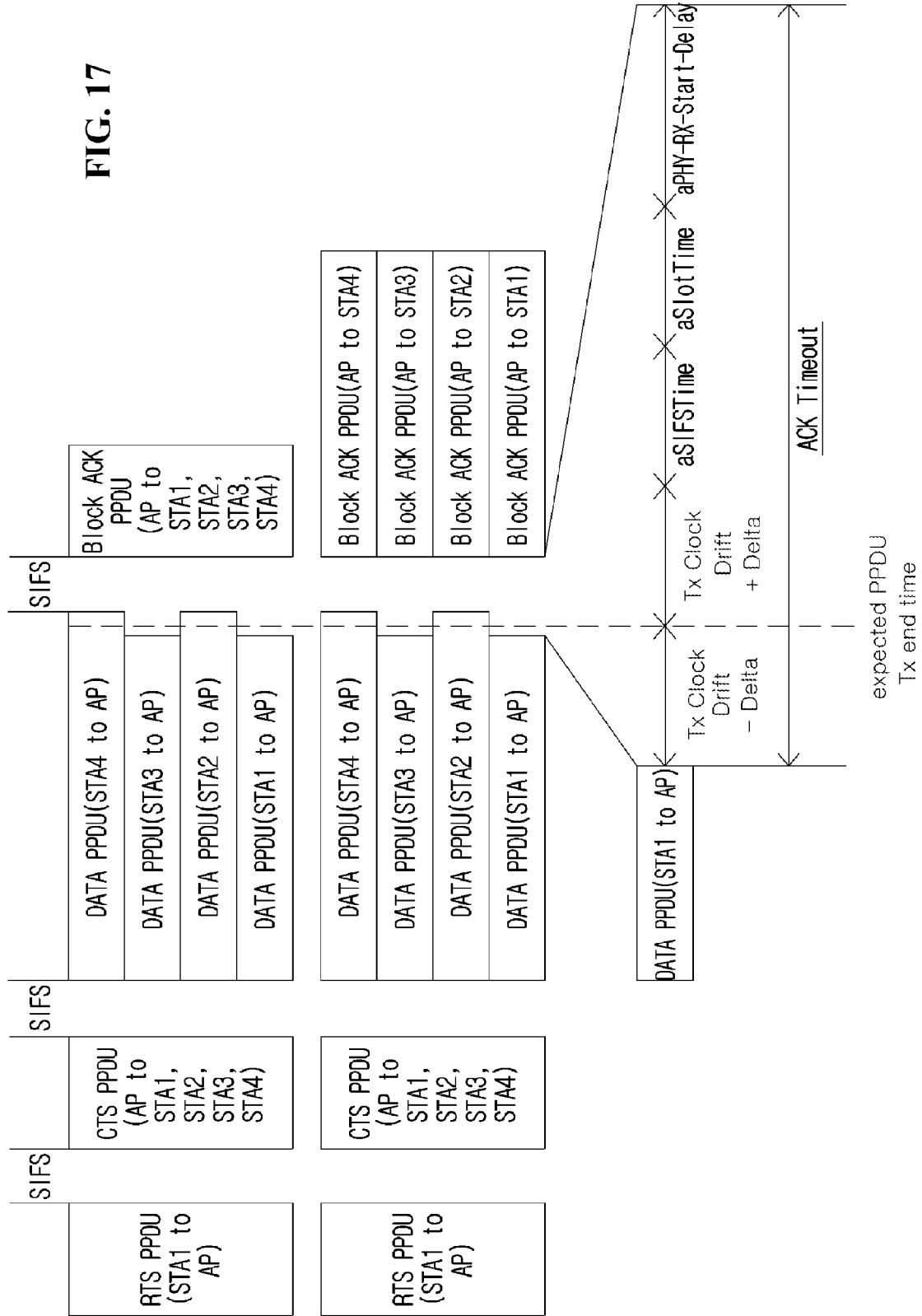

FIGS. 16 and 17 depict a method for setting an ACK timeout according to the present invention.

An ACK timeout is a time period during an STA waits for an ACK in response to a transmitted frame. Upon expiration of the ACK timeout, the STA may retransmit the frame. According to the present invention, an ACK timeout may be set in a different manner for a MU transmission from an SU transmission in which a single STA transmits a frame. For example, the ACK timeout for an MU transmission may be set to be longer than the ACK timeout for an SU transmission.

If a plurality of STAs are allocated to subchannels from an AP and transmit PSDUs simultaneously in MU-MIMO or OFDMA, the PHY layer of each transmitting STA reports a PHY-TXEND.confirm primitive to the MAC layer and then sets an ACKTimeout value. Upon expiration of a time corresponding to an ACKTimeout interval (or upon ACK-Timeout), an STA that has transmitted a PSDU may perform a retransmission operation.

For a legacy STA, the ACKTimeout interval is set to aSIFSTime+aSlotTime+aPHY-RX-START-Delay. An SIFS time aSIFSTime and a slot time aSlotTime may be determined according to the characteristics of the PHY layer. aPHY-RX-START-Delay represents a delay time until a reception time at the PHY layer. Specifically, aPHY-RX-START-Delay is a delay time spanning from a time specified by the PHY layer to a time when a PHY-RXSTART.indication primitive is issued. For a specific PHY layer characteristic, the SIFS time may be fixed and the slot time may be determined dynamically according to a change in an air propagation time aAirPropagationTime. The SIFS time and the slot time are defined respectively by [Equation 1] and [Equation 2].

$$aSIFSTime = aRxRFDelay + aRxPLCPDelay + aMACProcessingDelay + aRxTxTurnaroundTime \quad \text{[Equation 1]}$$

$$aSlotTime = aCCATime + aRxTxTurnaroundTime + aAirPropagationTime + aMACProcessingDelay \quad \text{[Equation 2]}$$

Like the example of FIG. 13, the lower drawing of FIG. 16 illustrates that STA1 transmits an RTS PPDU to an AP, the AP transmits a CTS PPDU including a list of STA1, STA2, STA3, and STA4, each STA transmits a DATA PPDU on its allocated subchannel in MU-MIMO or OFDMA, and the AP transmits a block ACK PPDU to each STA on each subchannel. Therefore, a redundant description of the lower drawing of FIG. 16 is not provided herein. Like the example of FIG. 14, the upper drawing of FIG. 16 illustrates that STA1 transmits an RTS PPDU to an AP, the AP transmits a CTS PPDU including a list of STA1, STA2, STA3, and STA4, each STA transmits a DATA PPDU on its allocated subchannel in MU-MIMO or OFDMA, and the AP transmits a block ACK PPDU to STA1, STA2, STA3, and STA4 on the total subchannels (i.e., on one channel). Therefore, a redundant description of the upper drawing of FIG. 16 is not provided herein.

In the example of FIG. 16, it is assumed that a maximum transmission time of one PPDU is 5 ms and the clock accuracy of an STA is up to +/−20 ppm (parts per million). It is also assumed that the starting time points of PPDU transmissions are synchronized among STAs that are allocated to subchannels and transmit PPDUs simultaneously on the subchannels in MU-MIMO or OFDMA. In this case, since the STAs transmit the PPDUs in a distributed system environment, the transmissions of the PPDUs may end at different time points for the STAs because of different clock accuracies of the STAs. In the example of FIG. 16, PPDU transmissions of STA1 and STA3 may end earlier than an expected PPDU transmission ending time. PPDU transmissions of STA2 and STA4 may end later than the expected PPDU transmission ending time. Let an error between transmission ending times be denoted by +/− Delta. Then, the Delta value may be up to 0.1 μs (=5 ms×20 ppm) under the above condition. Considering both cases in which a PPDU transmission ends earlier and later than an expected PPDU transmission ending time as illustrated in FIG. 16, an error of double the maximum Delta value (e.g., 0.2 μs) may occur to a PPDU transmission ending time.

Particularly, a PPDU transmission ending time error generated during simultaneous transmission of PPDUs from a plurality of STAs like a UL MU transmission (e.g., a UL MU-MIMO PPDU transmission or UL OFDMA PPDU transmission) may occur in a distributed system environment. Accordingly, there is a need for additionally reflecting such an error in setting ACKTimeout.

FIG. 17 illustrates an exemplary ACKTimeout value reflecting a transmission ending time error which is generated when a plurality of STAs transmit PPDUs simultaneously in MU-MIMO or OFDMA.

As described before, if only one transmitting STA is allowed to transmit a PPDU to an AP in a legacy WLAN system, an ACKTimeout for the transmitting STA is set to aSIFSTime+aSlotTime+aPHY-RX-Start-Delay. On the other hand, in the case where a plurality of transmitting STAs simultaneously transmit PPDUs to an AP as in a UL MU-MIMO transmission or UL OFDMA transmission, an ACKTimeout value may be set to be longer than conventionally (or by adding a predetermined parameter value (e.g., X)). For example, the ACKTimeout value may be set by ACKTimeout=aSIFSTime+aSlotTime+aPHY-RX-Start-Delay+X where X may be defined as an ACKTimeout correction value. For example, X may be 2× Transmission Clock Drift (Delay) as described before. For example, X may be 0.2 μs. Or X may be set to 1 μs or larger in order to reduce cost by allowing an implementation margin. Accordingly, the ACKTimeout-based retransmission procedure can be performed more accurately and more efficiently even in an MU-MIMO or OFDMA transmission.

It may be determined more accurately whether a data frame has been received successfully from at least one STA (or on at least one subchannel) among data frames (e.g., HE MU PPDU frames) transmitted simultaneously by a plurality of STAs by applying the above improved ACKTimeout. Therefore, if a data frame is received from at least one STA (or on at least one subchannel) within the improved ACK-Timeout, it may be considered that data frames have been received successfully from all users (or on all subchanels) and the corresponding MU transmission is free of an error, and an IFS value for the next channel access may be set (e.g., to the DIFS). If none of data frames are received successfully from all users (or on all subchannels) within the improved ACKTimeout, an IFS value for the next channel access may be set (e.g., to the EIFS) as in the case of a frame reception error. If simultaneous transmission of data frames from a plurality of STAs is elicited by transmission of a trigger frame from a receiver, the receiver may determine that the frame exchange procedure elicited by the trigger frame is successful and the corresponding MU transmission is free of an error.

If the AP determines that MU PPDU frames of UL data have been received successfully from a plurality of STAs, the AP may transmit an ACK PPDU frame (e.g., a block ACK PPDU transmitted by the AP in the examples of FIGS. 13 to 17). Hereinbelow, exemplary ACK PPDU frame formats transmitted in response to a received MU PPDU frame according to the present invention will be described.

Figure 18:
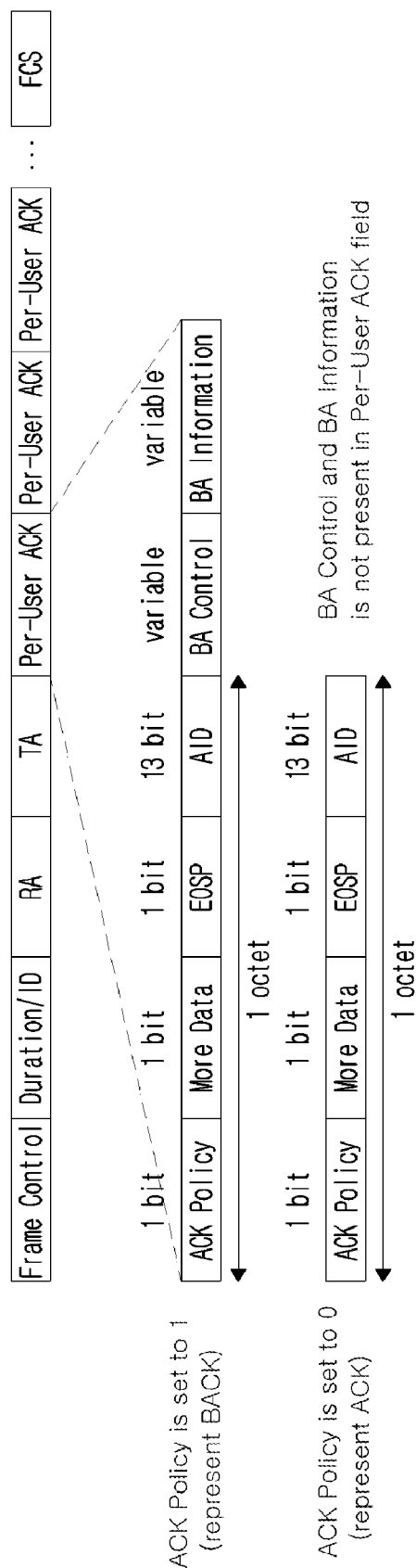
FIG. 18 illustrates an exemplary ACK PPDU frame format according to the present invention.

FIG. 18 illustrates an exemplary ACK PPDU frame format according to the present invention.

Upon receipt of an MU PPDU (e.g., a UL MU-MIMO PPDU or a UL OFDMA PPDU) from a plurality of STAs, an AP may respond to the MU PPDU with an aggregate of ACKs into one PPDU, as illustrated in the example of FIG. 18.

As in the example of FIG. 18, an ACK PPDU frame may include a Frame Control field, a Duration/ID field, a Receiver Address (RA) field, a Transmitter Address (TA) field, a plurality of Per-User ACK fields, and an FCS field.

Each Per-User ACK field includes ACK information about one target STA to which the AP is to transmit an ACK.

The Per-User ACK field may include an ACK Policy subfield, a More Data (MD) subfield, an EOSP subfield, an Association ID (AID) subfield, a Block ACK Control (BA Control) subfield, and a BA Information subfield.

The ACK Policy subfield may indicate that the Per-User ACK field indicates block ACK or normal ACK. For example, if the ACK Policy subfield is set to 1, this may mean block ACK and if the ACK Policy subfield is set to 0, this may mean normal ACK. If the ACK Policy subfield is set to 0, the BA Control subfield and the BA Information subfield which are related to the block ACK are not required and thus are not included in the Per-User ACK field. That is, the BA Control subfield and the BA Information subfield which are related to the block ACK may be included in the Per-User ACK field, only when the ACK Policy subfield is set to 1.

Irrespective of the value of the ACK Policy subfield, the Per-User ACK field may include the MD subfield, the EOSP subfield and the AID subfield. The MD subfield may be set to 1 to indicate that a More Data Ack subfield of a QoS capability element in a frame received from an STA is set to 1, the AP has one or more delivery-enabled access categories, and the AP has a pending transmission for the STA. The EOSP subfield is a 1-bit subfield used to indicate an ending point of a current SP. The AP may set the EOSP subfield to 1 to end a scheduled or unscheduled SP and otherwise, the AP may set the EOSP subfield to 0. The AID subfield may include an ID that the AP assigns to an STA during association in an operation of an infrastructure BSS (e.g., a BSS including an AP and one or more STAs). An AID may be 16 bits long.

If the ACK Policy subfield is set to 1 (i.e., indicating Block ACK (BACK)), the BA Control subfield and the BA Information subfield may be included in the Per-User ACK field in order to indicate a block ACK bitmap and block ACK start sequence control information for the block ACK.

If the ACK Policy of a UL MU PPDU that the AP receives from an STA requests normal ACK, the AP may configure a Per-User ACK field by setting the ACK Policy subfield to 0 and including the AID of the STA (i.e., the STA that has transmitted the UL MU PPDU). If the STA operates in the PSM, the AP may set the MD subfield and the EOSP subfield.

If the ACK Policy of a UL MU PPDU that the AP receives from an STA requests block ACK, the AP may configure a Per-User ACK field by setting the ACK Policy subfield to 1 and including the AID of the STA (i.e., the STA that has transmitted the UL MU PPDU), the BA Control subfield, and the BA Information subfield. If the STA operates in the PSM, the AP may set the MD subfield and the EOSP subfield.

Figure 19:
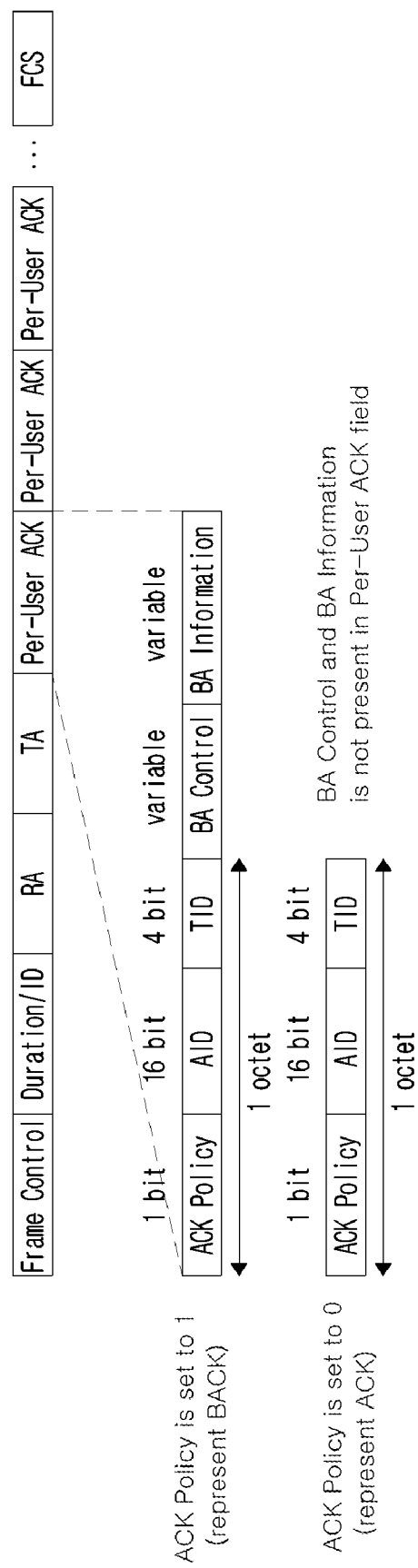
FIG. 19 illustrates another exemplary ACK PPDU frame format according to the present invention.

FIG. 19 illustrates another exemplary ACK PPDU frame format according to the present invention.

A trigger frame (e.g., a UL MU Poll frame) eliciting a UL MU transmission may include one or more of identification information about STAs for which the UL MU transmission is allowed, information about time-space streams for each STA, and information about a frequency allocation for each STA for the UL MU transmission (e.g., OFDMA transmission). The trigger frame may further include Traffic Identifier (TID) or Access Category (AC) information. A TID is allocated to a MAC entity by a higher layer, which identifies a MAC Service Data Unit (MSDU) based on QoS. An AC is a label for an EDCA parameter used to transmit an MSDU according to QoS-based priority.

If the trigger frame does not include TID or AC information, an MSDU may be transmitted in a UL MU PPDU frame irrespective of the TID or the AC. Otherwise, only an MSDU matching TID or AC information specified by the trigger fame may be transmitted in a UL MU PPDU frame.

After receiving a UL MU PPDU from the plurality of STAs for which the AP allows a UL MU transmission, the AP may transmit a block ACK frame including ACK states for the received MU PPDU. In this case, the AP may respond to the plurality of STAs with an aggregate of ACKs, as illustrated in the example of FIG. 19.

A redundant description of the same fields of an exemplary ACK frame illustrated in FIG. 19 as in FIG. 18 is not provided herein. One or more of fields included in only one of the ACK frame formats illustrated in FIGS. 18 and 19 may be included in one ACK frame format. That is, a Per-User ACK field may include at least one or all of the More Data field, the EOSP field, the AID field, or the TID field.

The Per-User ACK field may include ACK information for each combination specified by a pair of an AID and a TID.

The AID subfield of the Per-User ACK field may be set to an AID value (16 bits) of an STA for which a UL MU transmission is allowed.

The TID subfield of the Per-User ACK field may be set to a TID or AC value for a UL MU PPDU transmitted by the STA indicated by the AID subfield. In the absence of a setting for block ACK (i.e., the ACK Policy subfield of the Per-User ACK field indicates ACK), the TID subfield is set to 0, reserved.

If TID or AC information for UL MU PPDU transmission is included in a UL trigger frame, the TID subfield of the Per-User ACK field for an ACK for the UL MU PPDU transmission may be set to the same TID or AC value as indicated by the previous UL trigger frame.

If TID or AC information for a UL MU PPDU transmission is not included in a UL trigger frame, the TID subfield of the Per-User ACK field for an ACK for the UL MU PPDU transmission may be set to the same TID or AC value as received in the received MU PPDU.

The Per-User ACK field may be listed for each AID. For example, if an AP receives MPDUs having a plurality of different TID values from one STA, a plurality of Per-User ACK fields for the single STA may be included in a block ACK frame. In this case, the first of a plurality of Per-User ACK fields for the same AID corresponds to the lowest TID subfield value and the following Per-User ACK field(s) may be arranged in an ascending order of TID subfield values.

Figure 20:
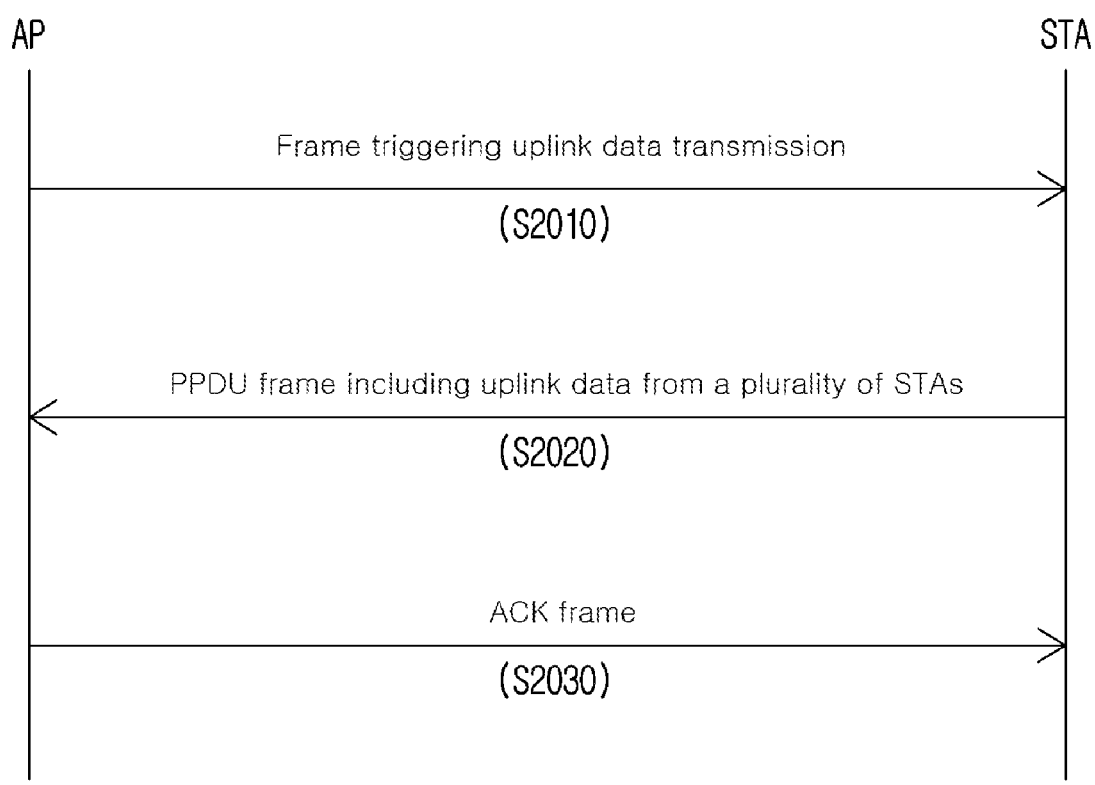
FIG. 20 is a flowchart illustrating an exemplary method according to the present invention.

FIG. 20 is a flowchart illustrating an exemplary method according to the present invention.

Referring to FIG. 20, an AP may transmit a frame that triggers a UL data transmission to a plurality of STAs in step S2010.

In step S2020, an STA may transmit a PPDU frame including UL data to the AP. The PPDU frame transmitted by the STA may include UL data that one or more other STAs transmit to the AP simultaneously with the STA. The plurality of different STAs may transmit their UL data to the AP on a plurality of subchannels, respectively (i.e., in UL MU-MIMO or OFDMA).

When the AP receives the UL data from the plurality of STAs, the AP may determine whether the PPDU frame including the UL data from the plurality of STAs has a reception error based on whether a reception error has occurred to each STA or each subchannel at the PHY layer. For example, if data has been received without an error from at least one of the plurality of STAs (or on at least one subchannel), it may be determined from the perspective of reception at the PHY layer (i.e., independently of decoding or non-decoding of a PSDU at the MAC layer) that the whole PPDU frame has been received without an error. Therefore, the AP may attempt the next channel access using the DIFS. If PHY reception errors occur to all of the plurality of STAs (or all of the plurality of subchannels), the AP may determine that the whole PPDU frame has a reception error and performs the next channel access using the EIFS.

The STA, which transmits a UL MU PPDU, may set a longer ACKTimeout than an ACKTime of a legacy STA (e.g., by adding an ACKTimeout correction value X).

The AP may transmit an ACK frame in response to the received UL data in step S2030. The ACK frame may be configured in the form of an aggregate of a plurality of Per-User ACK fields.

While the exemplary method has been described with reference to FIG. 20 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented independently or one or more of the embodiments may be implemented simultaneously, for the method of FIG. 20.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for transmitting an ACKnowledgement (ACK) in response to uplink data received from a plurality of Stations (STAs) by an Access Point (AP) in a Wireless Local Area Network (WLAN), the method comprising:

transmitting, to the plurality of STAs, a frame triggering transmission of a plurality of uplink data units from the plurality of STAs;

receiving a Physical layer Protocol Data Unit (PPDU) frame including a plurality of uplink data units from the plurality of STAs a predetermined Inter-Frame Space (IFS) after transmitting the trigger frame; and transmitting an ACK frame including ACKs for the plurality of data units from the plurality of STAs, wherein the ACK frame includes one or more ACK fields respectively corresponding to one or more of the plurality of STAs, wherein each of the one or more ACK fields includes a first subfield including identification information about a STA, a second subfield indicating block ACK or ACK, and a third subfield indicating a Traffic Identifier (TID), wherein when the second subfield included in the ACK field indicates block ACK, the ACK field includes block ACK bitmap information and block ACK starting sequence control information, and wherein when the second subfield included in the ACK field indicates ACK, the ACK field does not include the block ACK bitmap information and the block ACK starting sequence control information.

2. The method according to claim 1, wherein when a data unit is received without an error from at least one of the plurality of STAs, a frame exchange procedure initiated by the trigger frame is determined to be successful.

3. The method according to claim 1, wherein when a frame exchange procedure initiated by the trigger frame is determined to be successful, channel access of the AP is performed using a first IFS, and when the frame exchange procedure initiated by the trigger frame is determined to be failed, channel access of the AP is performed using a second IFS, and wherein the first IFS is shorter than the second IFS.

4. The method according to claim 1, wherein when the PPDU frame is determined to be received without an error, channel access of the AP is performed using a Distributed coordination function Inter-Frame Space (DIFS).

5. The method according to claim 1, wherein when all of the data units received from the plurality of STAs have errors, reception of the PPDU frame at the AP is determined to have an error.

6. The method according to claim 5, wherein when the reception of the PPDU frame is determined to have an error, channel access of the AP is performed using an Extended Inter-Frame Space (EIFS).

7. The method according to claim 1, wherein information transmitted from a PHYsical (PHY) layer of the AP to a Medium Access Control (MAC) layer of the AP includes information indicating end of reception, and
 wherein the information indicating end of reception includes a parameter indicating whether a reception error occurs to each of the plurality of STAs or each of the plurality of subchannels.

8. The method according to claim 7, wherein the information indicating end of reception is a PHY-RXEND.indication primitive and the parameter indicating whether a reception error occurs to each of the plurality of STAs or each of the plurality of subchannels is a USER_INDEX parameter.

9. A method for receiving an ACKnowledgement (ACK) in response to uplink data transmitted to an Access Point (AP) by a Station (STA) in a Wireless Local Area Network (WLAN), the method comprising:
 receiving, from the AP, a frame triggering transmission of a plurality of uplink data units from the STA and one or more other STAs;
 transmitting a Physical layer Protocol Data Unit (PPDU) frame including an uplink data unit of the STA a predetermined Inter-Frame Space (IFS) after receiving the trigger frame, when the other one or more STAs transmit one or more data units; and
 receiving an ACK frame including ACKs for the plurality of data units from the plurality of STAs,
 wherein the ACK frame includes one or more ACK fields corresponding to one or more of the plurality of STAs, respectively,
 wherein each of the one or more ACK fields includes a first subfield including identification information about a STA, a second subfield indicating block ACK or ACK, and a third subfield indicating a Traffic Identifier (TID),
 wherein when the second subfield included in the ACK field indicates block ACK, the ACK field includes block ACK bitmap information and block ACK starting sequence control information, and
 wherein when the second subfield included in the ACK field indicates ACK, the ACK field does not include the block ACK bitmap information and the block ACK starting sequence control information.

10. The method according to claim 9, wherein when all of the data units received from the plurality of STAs have errors, reception of the PPDU frame at the AP is determined to have an error.

11. The method according to claim 10, wherein when the reception of the PPDU frame is determined to have an error, an IFS for channel access of the AP is set to an Extended Inter-Frame Space (EIFS).

12. The method according to claim 9, wherein when the AP receives a data unit from at least one of the plurality of STAs without an error, a frame exchange procedure initiated by the trigger frame is determined to be successful.

13. The method according to claim 9, wherein when the AP determines that a frame exchange procedure initiated by the trigger frame is successful, an IFS for channel access of the AP is set to a first IFS, and
 when the AP determines that the frame exchange procedure initiated by the trigger frame is failed, the IFS for the channel access of the AP is set to a second IFS, and
 wherein the first IFS is shorter than the second IFS.

14. The method according to claim 9, wherein when the PPDU frame is determined to be received without an error, an IFS for channel access of the AP is set to a Distributed coordination function Inter-Frame Space (DIFS).

15. The method according to claim 9, wherein an ACK-Timeout for the STA is determined by the following equation, $$ACKTimeout = aSIFSTime + aSlotTime + aPHY\text{-}RX\text{-}Start\text{-}Delay + X$$

where aSIFSTime is a Short Inter-Frame Space (SIFS), aSlotTime is a slot time, aPHY-RX-Start-Delay is a delay time until a reception time at a physical layer, X is an ACKTimeout correction value.

* * * * *